US012582939B2

(12) United States Patent
Ma et al.

(10) Patent No.: US 12,582,939 B2
(45) Date of Patent: Mar. 24, 2026

(54) POROUS LIQUID, SELF-REPLENISHING POROUS LIQUID AND METHODS OF MAKING AND USING THE SAME

(71) Applicant: ExxonMobil Technology and Engineering Company, Annandale, NJ (US)

(72) Inventors: Ning Ma, Whitehouse Station, NJ (US); Mohsen S. Yeganeh, Newton, PA (US); Robert J. Colby, Annandale, NJ (US); Qiuzi Li, Clinton, NJ (US); Matthew S. Ide, Doylestown, PA (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 18/089,396

(22) Filed: Dec. 27, 2022

(65) Prior Publication Data

US 2023/0137305 A1     May 4, 2023

Related U.S. Application Data

(62) Division of application No. 16/660,058, filed on Oct. 22, 2019, now abandoned.

(Continued)

(51) Int. Cl.
| | |
|---|---|
| *B01D 53/14* | (2006.01) |
| *B01D 53/18* | (2006.01) |
| *B01D 53/22* | (2006.01) |
| *B01D 53/26* | (2006.01) |
| *B01D 67/00* | (2006.01) |
| *B01D 69/14* | (2006.01) |
| *B01J 20/08* | (2006.01) |
| *B01J 20/10* | (2006.01) |
| *B01J 20/22* | (2006.01) |
| *B01J 20/26* | (2006.01) |
| *B01J 20/28* | (2006.01) |

(Continued)

(52) U.S. Cl.
CPC ..... *B01D 53/1493* (2013.01); *B01D 53/1475* (2013.01); *B01D 53/1487* (2013.01); *B01D 53/18* (2013.01); *B01D 53/229* (2013.01); *B01D 53/263* (2013.01); *B01D 67/0093* (2013.01); *B01D 69/148* (2013.01); *B01J 20/08* (2013.01); *B01J 20/103* (2013.01); *B01J 20/22* (2013.01); *B01J 20/261* (2013.01); *B01J 20/28023* (2013.01); *B01J 20/28045* (2013.01); *B01J 21/08* (2013.01); *B01J 31/003* (2013.01); *B01J 31/26* (2013.01); *B01J 35/58* (2024.01); *C02F 1/26* (2013.01); *C02F 3/342* (2013.01); *B01D 2239/02* (2013.01); *B01D 2239/1208* (2013.01); *B01D 2252/2026* (2013.01); *B01D*

2252/20421 (2013.01); *B01D 2252/20478* (2013.01); *B01D 2252/20484* (2013.01); *B01D 2252/40* (2013.01); *B01D 2252/502* (2013.01); *B01D 2252/602* (2013.01); *B01D 2325/06* (2013.01); *C02F 2101/34* (2013.01)

(58) Field of Classification Search
CPC ........... B01D 53/1493; B01D 53/1475; B01D 53/1487; B01D 53/18; B01D 53/185; B01D 53/263; B01D 2252/2026; B01D 2252/20484; B01D 2252/40; B01D 53/229; B01D 67/0093; B01D 69/148; B01D 2239/02; B01D 2239/1208; B01D 2252/20421; B01D 2252/20478; B01D 2252/502; B01D 2252/602; B01D 2325/06; B01J 35/58; B01J 20/08; B01J 20/103; B01J 20/22; B01J 20/261; B01J 20/28023; B01J 20/28045; B01J 21/08; B01J 31/003; B01J 31/26; C02F 1/26; C02F 3/342; C02F 2101/34
USPC .......................................................... 261/95
See application file for complete search history.

(56) References Cited

U.S. PATENT DOCUMENTS

| | | | | | |
|---|---|---|---|---|---|
| 2,594,636 | A | * | 4/1952 | Gazda | ................ F02M 25/0225 |
| | | | | | 261/95 |
| 2,615,699 | A | * | 10/1952 | Dixon | ...................... B01J 19/32 |
| | | | | | 261/95 |

(Continued)

FOREIGN PATENT DOCUMENTS

| | | | |
|---|---|---|---|
| WO | 2017055615 A1 | 4/2017 | |
| WO | 2018191523 A1 | 10/2018 | |
| WO | WO 2018/201098 A2 * | 11/2018 | |

OTHER PUBLICATIONS

Abstract of WO 2018/201098 A2 (Year: 2018).*

(Continued)

*Primary Examiner* — Charles S Bushey
(74) *Attorney, Agent, or Firm* — C. Tumey Law Group PLLC

(57) ABSTRACT

The present disclosure relates to a porous liquid or a porous liquid enzyme system that includes a high surface area solid and a liquid film substantially covering the high surface area solid. The porous liquid or porous liquid enzyme may be contacted with a fluid that is immiscible with the liquid film such that a liquid-fluid interface is formed. The liquid film may facilitate mass transfer of a substance or substrate across the liquid-fluid interface. The present disclosure also provides methods of performing liquid-based extractions and enzymatic reactions utilizing the porous liquid or porous liquid enzyme of the present disclosure. The present disclosure also provides methods for selecting the components of the porous liquid or a porous liquid enzyme system and methods of self-replenishing the used liquid coating.

15 Claims, 17 Drawing Sheets

Related U.S. Application Data

(60) Provisional application No. 62/757,209, filed on Nov. 8, 2018, provisional application No. 62/757,206, filed on Nov. 8, 2018.

(51) Int. Cl.

| | |
|---|---|
| *B01J 21/08* | (2006.01) |
| *B01J 31/00* | (2006.01) |
| *B01J 31/26* | (2006.01) |
| *B01J 35/58* | (2024.01) |
| *C02F 1/26* | (2023.01) |
| *C02F 3/34* | (2023.01) |
| *C02F 101/34* | (2006.01) |

(56) References Cited

U.S. PATENT DOCUMENTS

| | | | | |
|---|---|---|---|---|
| 2,615,832 | A | * | 10/1952 | Dixon ..................... B01J 19/30 |
| | | | | 261/95 |
| 3,758,404 | A | | 9/1973 | Clonts et al. |
| 4,267,978 | A | | 5/1981 | Manteufel |
| 4,335,001 | A | * | 6/1982 | Aurelle ................ B01D 17/045 |
| | | | | 210/708 |
| 5,393,429 | A | | 2/1995 | Nakayama et al. |
| 6,293,526 | B1 | | 9/2001 | Fischer et al. |
| 6,402,818 | B1 | | 6/2002 | Sengupta et al. |
| 8,080,127 | B2 | * | 12/2011 | Chen ......................... F28C 3/08 |
| | | | | 261/DIG. 26 |
| 8,574,704 | B2 | | 11/2013 | Smith et al. |
| 9,947,481 | B2 | * | 4/2018 | Solomon ................. H01M 8/12 |
| 11,590,447 | B2 | * | 2/2023 | Yeganeh ............ B01J 20/28045 |
| 11,933,551 | B2 | * | 3/2024 | Dhiman ................ F28F 19/006 |
| 2013/0312608 | A1 | | 11/2013 | Zaman |
| 2015/0196940 | A1 | | 7/2015 | Aizenberg et al. |
| 2018/0094204 | A1 | * | 4/2018 | Larimer ............... C10M 107/50 |
| 2019/0176080 | A1 | * | 6/2019 | Liu .................... B01D 53/1493 |
| 2020/0147519 | A1 | * | 5/2020 | Ide ......................... B22F 3/105 |

OTHER PUBLICATIONS

"Borosilicate Glass." ProSciTech Pty. Ltd. (Aug. 10, 2017). Viewed on Sep. 21, 2022 at https://laboratoryresource.com.au/?navaction=getitem&id=225.

Stepankova, et al. Strategies for Stabilization of Enzymes in Organic Solvents, ACS Catalysis, Oct. 2013, pp. 2823-2836, American Chemical Society.

Fan, Engineering Apparel Fabrics and Garments, Woodhead Publishing, 2009, pp. 227-229.

O'Reilly, et al, Porous Liquids, Chemistry—A European Journal, Mar. 2007, pp. 3021-3025, vol. 132, Wiley-VCH Verlag Gmbh & Co. KGaA, Weinheim.

Bilek, et al. Plasma Modified Surfaces for Covalent Immobilization of Functional Biomolecules in the Absence of Chemical Linkers: Towards Better Biosensors and a New Generation of Medical Implants, Biophysical Reviews, May 2010, pp. 55-65, vol. 2, issue 2, Springer-Verlag.

Kawakami, et al, Immobilization of Glucose Oxidase on Polymer Membranes Treated by Low-Temperature Plasma, Biotechnology and Bioengineering, Jul. 1988, pp. 369-373, vol. 425, John Wiley & Sons, Inc.

Xin, et al, Liquid-liquid equilibria for the extraction of furfural from aqueous solution using different solvents, Fluid Phase Equilibria, Jun. 2016, pp. 393-401, Elsevier B.V.

Xu, et al, Preparation and characterization of novel CO2 "molecular basket" adsorbents based on polymer-modified mesoporous molecular sieve MCM-41, Microporous and Mesoporous Materials, Aug. 2003, pp. 29-45, vol. 62, Elsevier Inc.

Cao, et al. Capture of carbon dioxide from flue gas on TEPA-grafted metal-organic framework MG2(dobdc), Journal of Environmental Sciences, Oct. 2013, pp. 2081-2087, vol. 25, issue 10, Elsevier.

Hicks, et a, Designing Adsorbents for CO2 Capture from Flue Gas-hyperbranched Aminosilicas Capable of Capturing CO2 Reversibly, Journal of American Chemical Society, Feb. 2008, pp. 2902-2903, vol. 130, American Chemical Society.

Zaini, et al. Adsorption of Carbon Dioxide on Monoethanolamine (MEA)-Impregnated Kenaf Core Fiber by Pressure Swing Adsorption System, Jurnal Teknologi, Mar. 2014, pp. 11-16, Penerbit UTM Press.

The Partial Search Report and Provisional Opinion of PCT/US2019/057387 dated Feb. 10, 2020.

The Partial Search Report and Provisional Opinion of PCT/US2019/057378 dated Feb. 10, 2020.

The International Search Report and Written Opinion of PCT/US2019/057382 dated Feb. 10, 2020.

Office Action Summary for U.S. Appl. No. 16/660,058 dated Jun. 20, 2022.

Final Office Action Summary for U.S. Appl. No. 16/660,058 dated Sep. 27, 2022.

* cited by examiner

Surface functionalized high surface area media

"porous Liquid"

Liquid w/ or w/o reactants

Hydrocarbon (liquid or gas) and contaminants

Fiber of an uncoated glass wool

FIG. 6
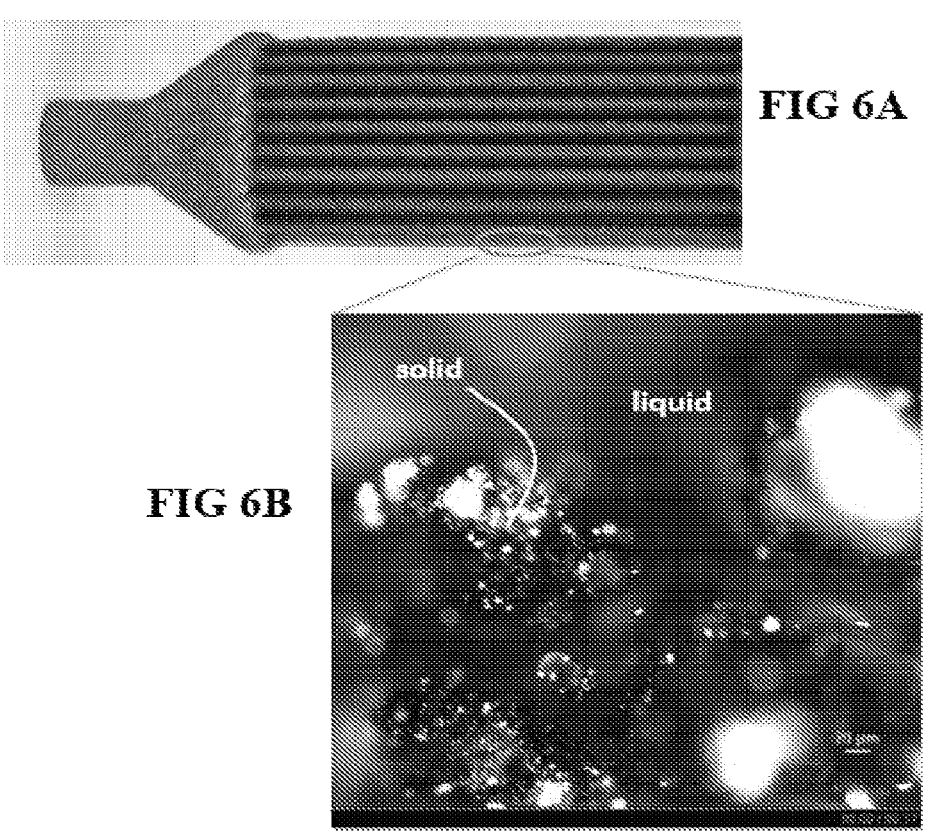
FIG 6A
FIG 6B
FIG. 6C
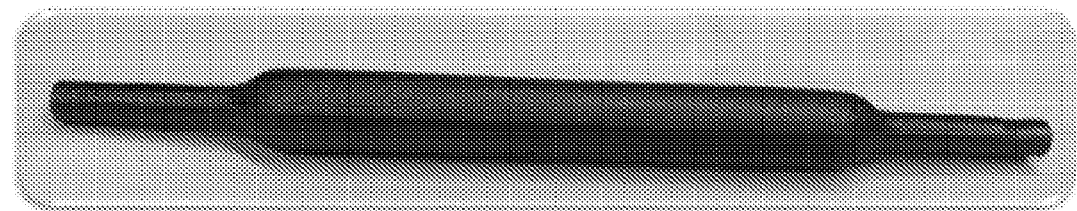

"Porous Amine": generated by functionalizing glass wool to hold MEA

MEA / Glass Wool, 50:50 CO2:N2 at 23 sccm, 5 psig, 30C-50C

Non-functionalized glass wool

Porous Toluene: PE
fibers + Toluene removed furfural

~60% Furfural Removal (2 g/L)

POROUS LIQUID, SELF-REPLENISHING POROUS LIQUID AND METHODS OF MAKING AND USING THE SAME

CROSS-REFERENCE TO RELATED APPLICATIONS

This application is a divisional of U.S. application Ser. No. 16/660,058, filed Oct. 22, 2019, which was abandoned and claims priority to U.S. Provisional Application No. 62/757,209 filed Nov. 8, 2018, and U.S. Provisional Application No. 62/757,206 filed Nov. 8, 2018, the entirety of each of which are herein incorporated by reference in their entirety.

FIELD

The present disclosure provides porous liquids and porous liquid enzymes and methods of using the same. In particular, a porous liquid of the present disclosure may be utilized to absorb or extract a substance from a working fluid and a porous liquid enzyme of the present disclosure may be utilized to catalyze a reaction with a substrate in a working fluid.

BACKGROUND

Interaction or mass transfer across a liquid/fluid interface, wherein the fluid (also referred to as working fluid) can be liquid or gas, plays an important role in many processes, including petrochemical-related processes, such as liquid-based extraction and bioconversion.

In a liquid-based extraction, a working fluid that contains species that need to be separated and removed is brought in contact with an appropriate liquid, i.e. a liquid that will extract or absorb the species to be removed. For simplicity, the species that must be removed may be referred to as contaminants. An appropriate selection of the liquid and liquid/fluid contactors allows for a mass transfer of the contaminant(s) from the working fluid to the liquid for separation and removal. Liquid-based absorption/extraction has been practiced in many important industrial applications. For example, removal of carbon dioxide from flue gas is carried out by contacting liquid amine or caustic solution (the liquid) with flue gas (the working fluid). Acidic $CO_2$ molecules transfer across the flue gas/liquid interface (i.e., mass transfer) into the basic amine (or caustic solution such as KOH) to selectively react with the same and be removed from the gas stream (the working fluid). This process can be highly beneficial for the removal of $CO_2$, but the process currently suffers due to the large amine dilution with water necessary to control viscosity and low gas-liquid contactor efficiency. As a result, the process requires large contactors and regenerators.

Similarly, removal of water molecules from a wet natural gas has been carried out by a liquid-based interaction for many years. The wet gas (the working fluid) is brought in contact with a glycol-based liquid (the liquid), such as triethylene glycol (TEG) liquid. Water molecules transfer across the TEG/natural gas interface into the liquid (mass transfer) where the water molecules are preferentially absorbed by hydrogen bonding with TEG molecules, thereby resulting in removal of the water molecules from the gas stream (i.e., the dehydration of the natural gas).

Another important example of a liquid-based extraction is the removal of reaction inhibitors, such as furfural from an aqueous solution of sugar. Sugar produced from plant waste materials contains furfural, which is detrimental to the conversion of sugar to biofuel. Thus, before converting sugar to biofuel, the inhibitor furfural must be removed from the sugar.

An effective liquid-based extraction requires an effective mass transport of the contaminants across the liquid/fluid interfaces. The efficiency of liquid-based extraction/absorption processes depends on the mass transfer rate across the liquid/fluid interface, which is strongly affected by the interfacial surface area between the liquid and fluid. Therefore, a high surface area between the liquid and the fluid is favored for profitable/efficient operations. As mentioned above, many commercial processes achieve higher surface areas by rigorously mixing the working fluid with the liquid in a tower with one or more contactors, which are designed to increase surface area between the fluid and the liquid in a fixed volume. This approach, however, requires high volumes of material and consumes a significant amount of energy, and even then, a substantial amount of liquid and fluid do not interact because of the poor surface-to-volume ratio. As a result, a substantial amount of the liquid and fluid still remain unused and ineffective.

The need for high energy mixing and large volume containers, as well as the large volume of unused fluid-liquid, often make the capital and operational expenditure of current practices high. Thus, there is a need to increase the surface area between the working fluid and the liquid (i.e., the interfacial surface area) in liquid-based extraction methods. This could reduce the required volume of materials in the extraction method and reduce capital and operational expenditure by reducing the required liquid-fluid contactor size.

In addition to molecular separation, mass transfer across the liquid/fluid interface is critical for reaction and product upgrading. For example, in bioconversion, enzymes (biological catalysts) are used to react with hydrocarbon species to generate high value products. Thus, enzymes can be utilized to remove heteroatoms or transform oil components to improve the yield and quality of the oil, as well as its refined products. The use of enzymes provides the potential processing advantages of low pressure and low temperature. Utilization of enzymes does not require hydrogen, and has low chemical costs with minimal equipment investment when compared to refinery operations. However, the majority of natural enzymes display lower catalytic efficiency or are denaturized in organic solvents compared with native aqueous solutions.

Many enzymatic reactions are performed with enzymes that have been immobilized on a substrate, which is one of the most common methods of improving enzyme stability in organic solvents. Additional advantages to utilizing immobilized enzymes include: (1) multiple reuses of the biocatalyst; (2) easy separation of the enzyme from the product; (3) flexibility in reactor design; (4) ability to regenerate the carrier; (5) the possibility to operate in both aqueous organic solvents; and (6) the possibility to operate in a continuous mode using column reactors. Thus, most of the current research focuses on the common strategies used for enzyme immobilization, including adsorption via hydrophobic/ionic interactions, covalent binding, cross-linking, entrapment, etc. ("Strategies for Stabilization of Enzymes in Organic Solvents," ACS Catalysis 2013, 3:2823-2836).

Such immobilization methods, however, face many limitations for scaling up and feasibility in industrial applications. In particular, the above mentioned immobilization methods are typically time-consuming, labor-intensive, costly, and require toxic chemicals, and complicated procedures. Thus, there is need for efficient, simpler, and lower cost methods of immobilizing enzymes that do not require toxic chemicals.

SUMMARY

The present disclosure describes a porous liquid and a porous liquid enzyme and methods of using the same. In particular, the inventors surprisingly discovered that use of a porous liquid of the present disclosure is a cost effective and extremely efficient method to absorb or extract a substance from a working fluid. Similarly, use of a porous liquid enzyme of the present disclosure is a cost effective and remarkably efficient method to catalyze a reaction with substrate in a working fluid. In particular, an aspect or the present disclosure provides a porous liquid or porous liquid enzyme (i.e., the article) that includes a high surface area solid, and a liquid that encapsulates the solid or infuses within the solid surface roughness or textures to substantially cover the high surface area solid (e.g., at least 30%, at least 50%, at least 70%, or at least 90% of the surface or surface area of the high surface area solid is covered by the infused or encapsulating liquid film and/or having a performance index greater than 150 m$^{-1}$). The working fluid is immiscible with the infused or encapsulating liquid and forms a liquid-fluid interface. The liquids of this disclosure interact with the working fluid at the liquid/fluid interface. The solid surface of the high surface area solid may have to be chemically and/or physically functionalized to hold an infused liquid and/or become encapsulated by the liquid. Physical functionalization includes texturing or roughening the solid surface. Chemical functionalization includes any surface chemical alteration that affects the wettability of liquid on the solid.

In some embodiments, the stability of the infused liquid coating or covering the high surface area solid decreases as the concentration of the substance or substrate in the infused liquid increases.

In some embodiments, the infused or encapsulating liquid covering the high surface area solid becomes unstable when the concentration of the species, substance, and/or substrate in the infused or encapsulating liquid reaches a threshold concentration (i.e., the concentration is at least the threshold concentration).

In certain embodiments, the porous liquid includes liquid that is infused within at least a portion of the texture of the high surface area solid. This is referred to herein as a liquid infused surface, infused liquid, or the like. When the liquid covers the entire top surface of the texture, it is referred herein to as a liquid encapsulated solid, encapsulation, or the like. Both a liquid infused surface and a liquid encapsulated solid may be referred to herein as a liquid impregnated solid.

The condition for infused liquid can be expressed in terms of a spreading number, Sn. Spreading number is a dimensionless parameter and is defined herein as:

$S_n = S_{OS}(w)/\gamma_{OW}$ with spreading coefficient, $S_{OS}(w)$; wherein $S_{OS}(w) = \gamma_{SW} - \gamma_{OS} - \gamma_{OW}$; wherein $\gamma_{SW}$ is the interfacial tension between a high surface area solid phase and a working fluid phase;

$\gamma_{OS}$ is the interfacial tension between an infused liquid phase and the high surface area solid phase; and $\gamma_{OW}$ is the interfacial tension between the infused liquid phase and the fluid phase.

The condition of infused liquid, in general, is:

$$\left(\frac{A_{ow}}{A_{os}} - 1\right) \le S_n;$$

wherein $A_{ow}$ is the interface area between the working fluid and the infused liquid; and $A_{os}$ is the interface area between the infused liquid and the solid.

In many cases the area between the working fluid and the infused liquid is smaller than the area of the liquid and the solid. Thus, without losing any generality, it is reasonable to set $$\left(\frac{A_{ow}}{A_{os}} - 1\right) \le 0.$$

In some embodiments, the liquid fully covers the surface, including texture and roughness. This case is referred to as an encapsulated condition. Encapsulated condition is a stronger condition for porous liquid systems or porous liquid enzyme systems than infused condition. Porous liquid systems or porous liquid enzyme systems require at least an infused condition. The encapsulated condition can be satisfied in terms of the spreading number as:

$0 \le S_n$.

In some embodiments, at least one of the following conditions is satisfied:

$$\gamma_{SW} = \gamma_S + \gamma_W - 2\sqrt[2]{\gamma_S^d \gamma_w^d} - 2\sqrt[2]{\gamma_S^p \gamma_w^p};$$

wherein $\gamma_S$ is the surface tension of the high surface area solid phase;

$\gamma_W$ is the surface tension of the fluid phase;

$\gamma_S^d$ is the dispersive component of the surface tension of the high surface area solid phase;

$\gamma_S^p$ is the polar component of the surface tension of the high surface area solid phase;

$\gamma_W^d$ is the dispersive component of the surface tension of the fluid phase; and $\gamma_W^p$ is the polar component of the surface tension of the fluid phase; or $$\gamma_{OS} = \gamma_O + \gamma_S - 2\sqrt[2]{\gamma_O^d \gamma_S^d} - 2\sqrt[2]{\gamma_O^p \gamma_S^p};$$

wherein $\gamma_O$ is the surface tension of the infused liquid phase;

$\gamma_O^d$ is the dispersive component of the surface tension of the infused liquid phase; and $\gamma_O^p$ is the polar component of the surface tension of the infused liquid phase; or $$\gamma_{OW} = \gamma_O + \gamma_W - 2\sqrt[2]{\gamma_O^d \gamma_W^d} - 2\sqrt[2]{\gamma_O^p \gamma_W^p};$$

or a combination thereof.

In some embodiments, at least one of:

$$\gamma_S = \gamma_S{}^d + \gamma_S{}^p;$$

$$\gamma_O = \gamma_O{}^d + \gamma_O{}^p;$$

$$\gamma_w = \gamma_w{}^d + \gamma_w{}^p;$$

or a combination thereof.

In some embodiments, a decrease in the spreading number from its initial value is indicative of a decrease in the stability of the infused or encapsulating liquid covering the high surface area solid, the porous liquid system, or porous liquid enzyme system.

In some embodiments, the solid surface has solid features or texture to stabilize the infused liquid coating when the spreading number is less than zero. This is the condition where the interface area between the liquid and the working fluid is substantially less than the interface area between the liquid and the solid. An example of this is a deep well that is filled with the liquid. This generates a large number of possibilities that the infused condition below can be satisfied:

$$\left( \frac{A_{ow}}{A_{os}} - 1 \right) \le S_n.$$

In some embodiments, the solid features or texture of the high surface area solid may include cylindrical solid features or texture. The location of stabilized infused liquid boundary of such solid features/texture may be determined using the infused condition given above.

In some embodiments, the solid features or texture can be any shape. For example, the solid features or texture can be substantially spherical, substantially triangular, substantially rectangular, or combinations thereof.

In some embodiments, the infused liquid covering the high surface area solid, the porous liquid system, or the porous liquid enzyme system becomes unstable. Unstability herein is defined as a Sn less than −0.5

In some embodiments, at least one of: (A) the high surface area solid includes at least one of: (1) a rough surface, a textured surface, or both; (2) a surface area of greater than 0.001 $m^2/g$ (e.g., about 0.001 to about 45 $m^2/g$); or (3) a combinations thereof; (B) the high surface area solid comprises a matrix of solid features (e.g., particles, pillars, elongated solid features, or the like) spaced sufficiently close to stably contain a liquid therebetween and/or therewithin (e.g., the solid feature may have an average dimension in a range of 0.1 µm to 1000 µm and/or be located about 0.1 µm to about 500 µm apart (e.g., the space between the solid features may be about 0.1 µm to about 500 µm apart)); (C) the high surface area solid includes wool, glass, glass wool, polyethylene, insoluble fibers, polyethylene wool, quartz, quartz wool, fibers, polymer fibers, additive manufactured structure (such as a 3D printed structure or laser metal deposition manufactured structure), or a combination thereof; (D) the high surface area solid is made of a material that is not reactive with the impregnating liquid; (E) the infused or encapsulating liquid (1) includes an enzyme and/or (2) is a film that facilitates mass transfer of at least one species, substance, or substrate across a liquid-fluid interface formed with a fluid that is immiscible with the infused or encapsulating liquid; (F) the infused or encapsulating liquid includes at least one of: (1) an amine, (2) monoethanolamine, (3) tetraethylenepentamine, (4) an alkali metal hydroxide, (5) potassium hydroxide, (6) sodium hydroxide, (7) lithium hydroxide, (8) glycol, (9) triethylene glycol, (10) an enzyme (e.g., cytochrome c), or a combination thereof; (G) the infused or encapsulating liquid has a thickness from the bottom of the roughness or the texture to the top surface of the infused liquid that is no greater than 1400 µm (e.g. a thickness no greater than 1000 µm, about 10 µm to about 1000 µm, or about 10 µm to about 100 µm); or (H) a combination thereof.

In some embodiments, the surface area of the high surface area solid is greater than 0.001 $m^2/g$ (e.g., about 0.001 $m^2/g$ to about 45 $m^2/g$). In some embodiments, the surface area, S, of the high surface area solid per volume of the high surface area solid, S/V, is greater than 180 $m^{-1}$, greater than 500 $m^{-1}$, or greater than 1000 $m^{-1}$. For purposes of this calculation, surface area, S, includes the surface area provided by both the internal-facing and external-facing surface areas of the structure. However, given that it is difficult to account for micro-scale surface roughness, the calculation of S presumes that the internal-facing and external-facing surfaces are smooth. For example, the calculation of S includes the additional surface area provided by the cellular structures inside the matrix, but presumes for simplicity that the surfaces of the walls making up the cells are smooth. The system volume, V, is defined as the geometric volume of the structure based only on the dimensions of the external surfaces, and presuming those surfaces are smooth. In other words, V is calculated in a simplified manner that presumes a solid structure defined by its external surfaces, with no micro-textures on those external surfaces and no internal matrix. These calculations can be performed by a software program such as nTopology Element or Autodesk NetFabb.

In some embodiments, the performance index (PI) of the system is greater than 150.0 $m^{-1}$ or greater than 500.0 $m^{-1}$. PI is defined as PI=(Vl/N)(AlN). Vl and Al are the volume and surface area of the impregnating liquid, respectively. Vl may be determined by weighing the high surface area solid before and after applying the impregnating liquid, and then converting the mass difference (e.g., the mass of liquid held by the apparatus) into a volume using the density of the liquid. Where the liquid perfectly or nearly-perfectly wets all of the surfaces of the high surface area solid, Al is essentially equal to S, the surface area of the high surface area solid. In such cases, S is substituted for Al in the calculation of PI for simplicity. For purposes of the PI calculation herein, perfect or near-perfect wetting is presumed and thus S is used for Al in the calculation of PI. The amount of liquid that the apparatuses disclosed herein uptake suggests that this assumption is reasonable. Systems with a PI greater than 150 $m^{-1}$ are more efficient, and thus can be smaller and less expensive than conventional systems.

Another aspect of the present disclosure provides a high surface area solid device capable of continuously refreshing an infused or encapsulating liquid. The high surface area solid comprises: a reservoir having an exterior surface and configured to contain fresh or unused infused liquid therein, wherein at least one side of the exterior surface includes (1) solid features (e.g., elongated solid features or pillars) extending outward therefrom and (2) at least one opening (such as a plurality of openings) that allows the fresh or unused infused or encapsulating liquid to flow from the reservoir to the solid features.

In some embodiments, the fresh or unused infused or encapsulating liquid includes (1) infused or encapsulating liquid with a lower concentration of the substance or substrate that undergoes a mass transfer from a fluid (e.g., a fluid that is immiscible with the infused or encapsulating liquid and forms a liquid-fluid interface with the infused or encapsulating liquid) to the infused or encapsulating liquid, relative to the unstably coating infused or encapsulating liquid, or (2) infused or encapsulating liquid that this substantially free of the substance or substrate that undergoes a mass transfer from the fluid to the infused or encapsulating liquid.

In some embodiments, the high surface area solid further comprises at least one inlet for supplying at least one of the fresh or unused infused or encapsulating liquid, pressure, or a combination thereof.

In some embodiments, at least one of: the solid feature has a length that is no greater than about 100 times the width of the solid feature; the solid feature has a width of about 1 μm to about 10 mm; the openings have width of about a μm to about 1,000 μm; the solid features are about 10 μm to about 1,000 μm apart; the reservoir has a width, a length, or both that is/are at least about 0.1 mm; the reservoir has a height that is at least about 0.1 mm; or a combination thereof.

A further aspect of the present disclosure is a method of recoating the porous liquid or porous liquid enzyme of the present disclosure, the method comprising: contacting a porous liquid system or porous liquid enzyme system having an unstable infused or encapsulating liquid coating with fresh or unused infused or encapsulating liquid, wherein contacting the porous liquid system or porous liquid enzyme system with the unstable infused or encapsulating liquid coating with the fresh or unused infused or encapsulating liquid results in a porous liquid or porous liquid enzyme with a stable coating of infused or encapsulating liquid.

In some embodiments, the unstable infused or encapsulating liquid coating (e.g., the used or spent infused or encapsulating liquid of the unstable porous liquid system or porous liquid enzyme system) is an infused or encapsulating liquid with a concentration of the substance or substrate that undergoes a mass transfer that: (1) is greater than the fresh or unused infused or encapsulating liquid; (2) is above a threshold concentration that results in decreased transfer efficiency, decreased enzymatic activity, and/or a decrease in stability that results in displacement of the infused or encapsulating liquid, thereby decreasing transfer efficiency and/or enzymatic activity; (3) results in a spreading number that is less than or equal to 0 for an encapsulated condition and between –0.5 and 0 for an infused condition; or (4) is a combination thereof.

In some embodiments, a stable coating of infused or encapsulating liquid includes a coating of an infused or encapsulating liquid that is substantially free of the substance or substrate that undergoes a mass transfer from the fluid to the infused or encapsulating liquid of or has a concentration of the species, substance or substrate that results in a stable coating or covering of the surface area solid with infused or encapsulating liquid.

In some embodiments, the fresh or unused infused liquid is substantially free of the substance or substrate that undergoes a mass transfer from the fluid to the infused or encapsulating liquid.

In some embodiments, the porous liquid system or porous liquid enzyme system with the unstable infused or encapsulating liquid coating has a spreading number less than or equal to –0.5.

In some embodiments, the fluid is a gas.

In some embodiments, at least one of: the fluid includes carbon dioxide (such as a flue gas, or a chemical or refinery gas); the liquid film includes an amine (e.g., monoethanolamine, tetraethylenepentamine), potassium hydroxide, or both; or a combination thereof.

In some embodiments, at least one of: the fluid includes water (such as wet natural gas); the liquid film includes glycol (e.g., triethylene glycol); or combinations thereof.

In some embodiment, the fluid is a liquid.

In some embodiments, at least one of: the fluid includes furfural, the liquid film includes toluene, the high surface area solid comprises polyethylene, or combinations thereof.

Another aspect of the present disclosure provides a method of selecting a high surface area substrate of a porous liquid system or a porous liquid enzyme system. The method comprises: selecting at least one of an infused or encapsulating liquid, a fluid that is immiscible with the infused or encapsulating liquid, or both; and selecting a high surface area solid that results in a porous liquid system or porous liquid enzyme system with a spreading number of at least 0, for an encapsulation condition and between –0.5 and 0 for an infused condition, wherein:

$$S_n = (\gamma_{SW} - \gamma_{OS} - \gamma_{OW})/\gamma_{OW};$$

$\gamma_{SW}$ is the interfacial tension between a high surface area solid phase and a fluid phase;

$\gamma_{OS}$ is the interfacial tension between an infused liquid phase and the high surface area solid phase; and $\gamma_{OW}$ is the interfacial tension between the infused liquid phase and the fluid phase, and wherein the infused liquid substantially covers the high surface area solid (e.g., at least 30% of the surface or surface area of the high surface area solid is coated or infused by the infused liquid), and the immiscible fluid forms a liquid-fluid interface with the infused liquid.

An additional aspect of the present disclosure provides a method of preparing a porous liquid system or a porous liquid enzyme system. The method comprises: selecting at least one of an infused or encapsulating liquid, a fluid that is immiscible with the infused or encapsulating liquid, or both; selecting a high surface area solid that results in a porous liquid system or a porous liquid enzyme system with a spreading number of at least 0 for encapsulation condition and between –0.5 and 0 for an infused condition, and contacting the high surface area solid with the infused liquid, wherein:

$$S_n = (\gamma_{SW} - \gamma_{OS} - \gamma_{OW})/\gamma_{OW};$$

$\gamma_{SW}$ is the interfacial tension between a high surface area solid phase and a fluid phase;

$\gamma_{OS}$ is the interfacial tension between an infused liquid phase and the high surface area solid phase; and $\gamma_{OW}$ is the interfacial tension between the infused liquid phase and the fluid phase, and wherein the infused liquid substantially covering the high surface area solid (e.g., at least 30% of the surface or surface area of the high surface area solid is coated or infused by the infused liquid), and the immiscible fluid forms a liquid-fluid interface with the infused or encapsulating liquid.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the disclosure may be utilized in numerous combinations, all of which are expressly contemplated by the present description. These additional aspects and embodiments are expressly included within the scope of the present disclosure. The publications and other materials used herein to illuminate the background of the disclosure, and in particular cases, to provide additional details respecting the practice, are incorporated by reference.

BRIEF DESCRIPTION OF THE DRAWINGS

The accompanying drawings, which are incorporated into and form a part of the specification, illustrate several embodiments of the present disclosure and, together with the description, serve to explain the principles of the disclosure. The drawings are only for the purpose of illustrating an embodiment of the disclosure and are not to be construed as limiting the disclosure. Further objects, features and advantages of the disclosure will become apparent from the following detailed description taken in conjunction with the accompanying figures showing illustrative embodiments of the disclosure, in which:

FIG. 4A illustrates the contact angle (θ) between the infused liquid and the solid in the presence of a working fluid, and FIG. 4B illustrates an exemplary high surface area solid that includes cylindrical solid features or texture.

FIG. 5A is a cross-sectional schematic of an exemplary high surface area solid capable of continuously refreshing an infused or encapsulating liquid. FIG. 5B is a schematic view looking down at a side of the exterior surface of the exemplary high surface area solid of FIG. 5A.

FIGS. 6A, 6B and 6C. FIG. 6A shows an exemplary image of a 3D printed solid structure, which can be utilized as the high surface area solid, in the preparation of a porous liquid or a porous liquid enzyme of the present disclosure. This structure contains 69 straight metallic filaments, each with a diameter of about 800 μm and length of 25 mm, and S/V=1487 m$^{-1}$. Each filament contains surface porosity that can hold liquid to produce a liquid impregnated surface. FIG. 6B shows an optical micrograph of the surface of one of the filaments that is holding liquid within its roughness. FIG. 6C shows an exemplary 3D printed structure of a high surface area solid surface. It has 800 micron diameter filaments mounted with surface-to-surface distance of 500 microns in a tube of 1.1 cm inner diameter and approximate length of 8 cm, producing S/V=1487 m$^{-1}$. The structure and the tube surrounding the structure were printed using additive manufacturing laser metal deposition of aluminum oxide.

FIG. 7 shows time lapse images of a flowing liquid within the roughness of each filament of the 3D printed structure of FIG. 6A. To illustrate the fluidic nature of the infused liquid a particle was placed in the liquid and its flow in the liquid was followed in time. The images clearly show the fluid nature of the liquid.

FIG. 8A is a schematic of an exemplary porous liquid containing an amine. FIGS. 8B and 8C demonstrate the use of an exemplary porous liquid of the present disclosure to remove carbon dioxide from a gaseous mixture, such as flue gas (nitrogen and carbon dioxide mixture were used as an exemplary carbon dioxide gaseous mixture). FIG. 8D is a schematic of the control for the experiments of FIGS. 8A-8C. As shown by FIGS. 8E and 8F, quartz wool is ineffective at absorbing carbon dioxide without the amine containing liquid film of FIGS. 8A-8C.

FIG. 9A is a schematic of an exemplary porous liquid containing tetraethylenepentamine (TEPA) with high PI. It demonstrates the use of an exemplary porous liquid of the present disclosure to remove carbon dioxide from a gaseous mixture, such as flue gas. FIG. 9B compares the weight normalized breakthrough time of porous liquid using tetraethylenepentamine and the same solid substrate not impregnated with any amine (control), at 130° C. The solid is the same as shown in FIG. 6A. The surface chemistry of the 3D printed structure was modified using plasma to make it suitable for liquid impregnation by the amine liquid. As shown by FIG. 9B, the 3D printed solid structure is ineffective at absorbing carbon dioxide without the infused liquid amine. FIG. 9C is a schematic of an exemplary porous liquid containing TEPA with high PI. It demonstrates the use of an exemplary porous liquid of the present disclosure to remove carbon dioxide from a gaseous mixture, such as flue gas. FIG. 9D shows the weight normalized breakthrough time of porous liquid using TEPA at 130° C. The variations of mass spectrometer N2 signal intensity with time is also shown. Time equal zero is when the signal intensity of N2 reaches its 5% of its maximum value. The surface chemistry of the 3D printed structure was modified by leaving the structure in an air oven for 3 hours at 400° C. This makes it suitable for liquid impregnation by the amine liquid. As shown by FIGS. 9B and 9D, the porous liquid TEPA is effective at absorbing carbon dioxide. FIG. 9E is a schematic of an exemplary porous liquid containing TEPA with low PI. It demonstrates the use of an exemplary porous liquid of the present disclosure to remove carbon dioxide from a gaseous mixture, such as flue gas. FIG. 9F shows the weight normalized breakthrough time of porous liquid using TEPA at 130° C. No surface modification was used for this ceramic monolith.

FIG. 10 demonstrates that the glycol containing porous liquid efficiently absorbs water from wet hydrocarbon gas.

FIG. 11A shows an exemplary porous liquid toluene before (left) and after (right) immersion in the furfural solution. The porous liquid toluene efficiently absorbed furfural from the solution, as demonstrated by the yellow-brown color of the porous liquid after immersion in the furfural solution (right). FIG. 11B illustrates the UV-Vis analysis of the furfural solution before and after it has been contacted with the porous liquid toluene. A significant amount of furfural was removed from the treatment of the solution with the porous liquid toluene.

FIG. 12 shows conversion of nickel octaethylporphyrin with a porous liquid enzyme of the present disclosure with cytochrome c immobilized on quartz wool, as well as a no treatment control.

FIG. 13 illustrates the dependence of the spreading number (Sn) on the surface tension of the solid ($\gamma$S) and the encapsulating liquid ($\gamma$O). The white domain indicates a stabilized porous liquid or porous enzyme design, wherein the spreading number is positive (e.g., greater than 0). The points represented on the graph show experimental data for the following encapsulating liquid and high surface area combinations: (1) toluene/polyvinyl chloride, (2) toluene/polyethylene, and (3) toluene/Teflon™, which demonstrate that stabile porous liquid systems or porous enzyme systems have a positive spreading number.

FIG. 14 illustrates the effect of increasing concentration of the substance or substrate that undergoes mass transfer from a working fluid to an encapsulating liquid. As illustrated by the exemplary pairing of glycol as the encapsulating liquid and water as the substance that undergoes mass transfer, the stability of the encapsulating liquid coating the high surface area solid decreases as the concentration of the substance or substrate increases, thereby moving from the white region to the black region—i.e., the Sn moves from being positive (white region) to being negative (black region).

DETAILED DESCRIPTION

Figure 1:
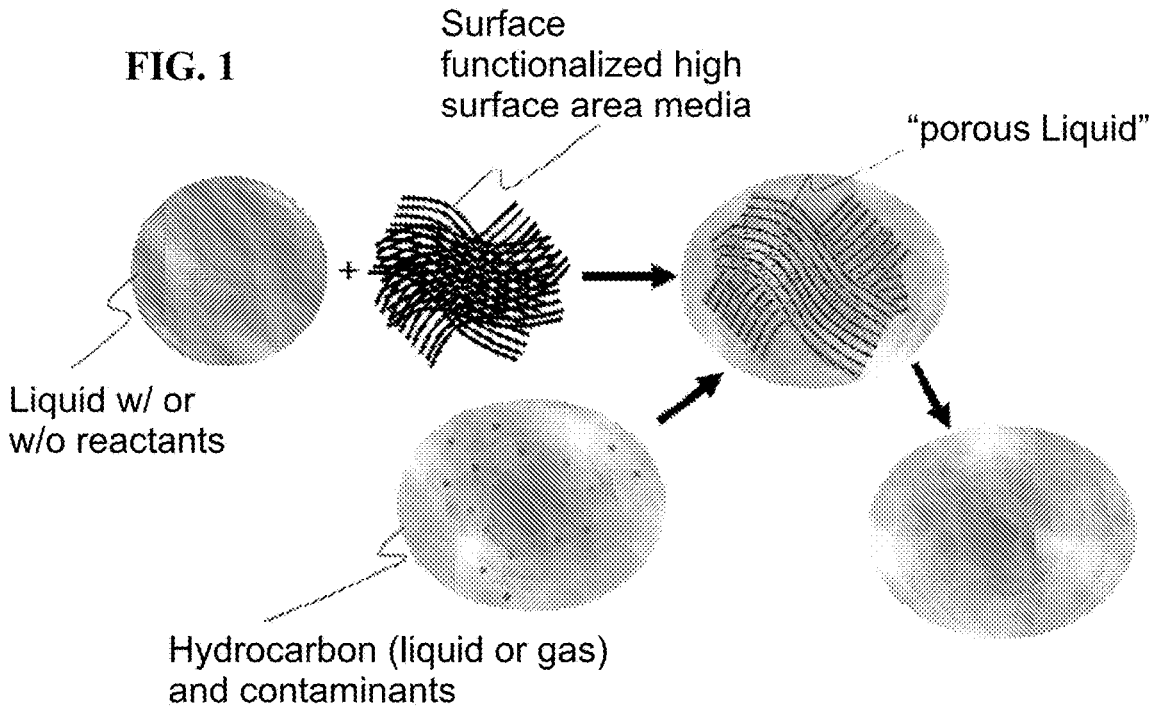
FIG. 1. Illustrates the porous liquid or porous liquid enzyme of the present disclosure.

The following is a detailed description provided to aid those skilled in the art in practicing the present disclosure. Those of ordinary skill in the art may make modifications and variations in the embodiments described herein without departing from the spirit or scope of the present disclosure. All publications, patent applications, patents, figures and other references mentioned herein are expressly incorporated by reference in their entirety.

Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

The following terms are used to describe the present disclosure. In instances where a term is not specifically defined herein, that term is given an art-recognized meaning by those of ordinary skill applying that term in context to its use in describing the present disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, in certain methods described herein that include more than one step or act, the order of the steps or acts of the method is not necessarily limited to the order in which the steps or acts of the method are recited unless the context indicates otherwise.

The term "porous liquid enzyme" as used herein, unless the context indicates otherwise, can describe a porous substrate having a high surface area and a liquid film covering as described herein, and further comprising one or more enzymes within the liquid film. For example, the porous liquid enzyme of the present disclosure may comprise a high surface area solid, and a liquid film substantially covering the high surface area solid (e.g., at least 30%, at least 50%, at least 70%, or at least 90% of the surface or surface area of the high surface area solid is covered by the infused liquid film), wherein the liquid film includes at least one enzyme or type of enzyme (e.g., 1, 2, 3, 4, 5, 6, 7, 8, 9, 10, or more enzymes).

Figure 4A:
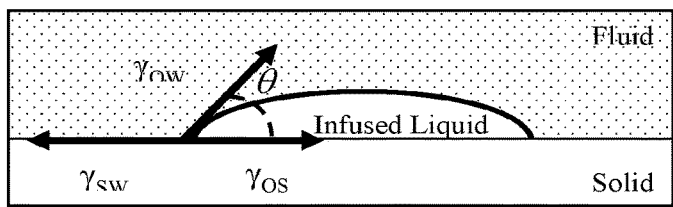
FIGS. 4A and 4B.

The terms "coating" or "covering" as used herein, unless the context indicates otherwise, describes covering of the solids by an infused or encapsulating liquid. The solid surface is impregnated with liquid (infused or encapsulating liquid) by appropriate solid surface functionalization that includes chemical functionalization and in some cases textured/physical functionalization. In some instances, roughness of the surface acts as the intrinsic surface texture. The impregnating liquid covers the solid surface and keeps its liquid nature. It is this liquid nature that can provide a medium for separation, extraction, and enzyme immobilization. The liquid is able to infuse into the surface of the solids or encapsulate the entire solid surface because its chemistry allows the liquid to substantially spread onto the solid. The spreading is measured using the liquid contact angle on the solid (see FIG. 4A). In cases that the working fluid is also a liquid, the contact angle is measured in the presence of the working liquid.

The present disclosure enables one to significantly increase the interfacial surface area of a liquid/fluid interface in a liquid-based absorption or liquid-based extraction process (or enzyme immobilization). Suitable high surface area substrates may be determined for a particular combination of infused liquid and working fluid by examining the interfacial tensions between the phases, which can be represented or illustrated by a spreading number, Sn.

The present disclosure describes a porous liquid and a porous liquid enzyme and methods of using the same. In particular, the inventors surprisingly discovered that a porous liquid of the present disclosure is a cost effect and extremely efficiently method to absorb or extract a species or substance from a working fluid, and similarly, a porous liquid enzyme of the present disclosure is a cost effective and remarkably efficient method to catalyze a reaction with substrate in a working fluid. The porous liquid described herein does not rely on shear stress for moving liquid and thus can be used for liquid-liquid as well as liquid-gas systems. In addition, the porous liquid does not have to form a stretched fiber geometry and thus can provide other geometries with higher surface contact area. Additionally, the porous liquid can also be utilized to immobilize enzymes for biological reactions.

An aspect of the present disclosure provides an article including a liquid-impregnated surface, which may be referred to as a porous liquid or porous liquid enzyme depending upon the substances included therein. A porous liquid and/or porous liquid enzyme may be based on the surface energy matching between a liquid film and a high surface area solid to form a stable liquid layer/film that is not readily removed from the surface of the high surface area solid. Thus, in any aspect or embodiment described herein, the liquid film stably covers the high surface area solid and/or is contained within the rough and/or textured surface (e.g., a matrix of solid features described below) regardless of orientation of the porous liquid or porous liquid enzyme, such as under normal shipping and/or handling conditions.

The porous liquid or porous liquid enzyme comprises a high surface area solid, and a liquid film substantially coating or covering the high surface area solid (e.g., at least 30%, at least 40%, at least 50%, at least 60%, at least 70%, at least 80%, or at least 90% of the surface or surface area of the high surface area solid is covered by the infused liquid film and/or a PI greater than 150 m$^{-1}$). For example, the surface or surface area of the high surface area solid may be at least 30%, 35%, 40%, 45%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% coated by the liquid film. In certain aspect, the high surface area solid is made of a material that is not reactive with the liquid film.

O'Reilly et al. in Chemistry—A European Journal, volume 13, issue 11 (2007) teaches what they call micro-porous (and porous) liquid. O'Reilly et al. generated their porous liquid by introducing a rigid cage-like molecule, such as cyano-bridged metallocubes, in a liquid solvent. The cage-like molecule is selected such that the opening of the cage is small enough that the solvent molecules cannot enter the cage, thus preserving the void within the cage. This approach is fundamentally different than what is described herein. Here, a high surface area liquid or a porous liquid is generated by infusing a liquid on a functionalized surface of a high surface area solid. This approach allows for the direct contact of the porous liquid with a working fluid for separation and/or reaction.

U.S. Pat. No. 6,402,818 B1 (Sengupta et al.) teaches the use of hollow fiber membrane contactors to allow for the mass transfer of dissolved gas in liquid across the membrane into a low pressure environment. The same membrane prevents mass transfer of liquid through the membrane due to high capillary forces. The planar geometry of the membrane forces a radial configuration for increasing surface area. In contrast to membrane contactors, the porous liquid of the present disclosure brings fluid and liquid in direct contact without any barrier. Furthermore, the porous liquid of the present disclosure can be formed not only into a planar geometry similar to membranes, but can include other shapes and geometries, such as fibers (including wool), etc. As a result, a significant increase in the amount of surface area, which is critical for effective mass transfer across the interface, can be achieved by the porous liquid of the present disclosure.

International Patent Application Publication No. WO2017055615 A1 (Deng et al.) teaches the use of a composite membrane to capture $CO_2$ from a mixed gaseous feed. The composite membrane allows $CO_2$ to mass transport across the membrane where it can be absorbed using a carbon dioxide capturing organic solvent. This approach is intrinsically different than that of the porous liquid of the present disclosure, where liquid absorbing $CO_2$ is in direct contact with gaseous feed. The high surface area of the porous liquid of the present disclosure is produced by shaping the liquid film into a porous geometry. This is possible through the use of a porous functionalized solid surface (or high surface area solid) that holds the liquid film in place.

Trays and sheets of liquid-liquid contactors have also been used in mixing towers. For example, U.S. Pat. No.

5,393,429 (Nakayama et al.) teaches the use of non-agitation countercurrent flow in liquid-liquid contactors. They utilize splitter plates and slits, as well as holes to mix two (heavy and light) liquids. The tray contactors are made in such a manner that the counter flow of the two liquids forces them to generate the interfacial area needed for mass transfer across the interface. In order to generate a sufficiently high contact area, however, a large volume tower is required for tray and sheet contractor. In contrast, the porous liquid of the present disclosure utilizes a stationary layer of liquid formed in a high surface area geometry (i.e., the liquid film) to produce a high surface contact area in a much smaller volume.

U.S. Pat. No. 3,758,404 (Clonts et al.) uses fiber film contactors where a bundle of fibers stretched from upstream to downstream of an extractor. In this approach, one liquid preferentially wets the fibers and the second liquid, that normally contains contaminants, flows over the first liquid. The mass transfer of contaminants across the interface occurs during the flow. Because of the shear stress at the interface of the two liquids, the second liquid pulls the first liquid from upstream to downstream into a collection vessel for separation and regeneration. The existence of a shear stress is critical for this approach, and thus fiber film contactors cannot be applied to a liquid-gas system. In addition, in this approach fibers must be stretched from upstream to downstream to allow flow of the liquid into the collecting vessels. In contrast, the porous liquid described herein does not rely on shear stress for moving liquid and thus can be used for both liquid-liquid systems and liquid-gas systems.

Bilek et al. (Plasma Modified Surfaces for Covalent Immobilization of Functional Biomolecules in the Absence of Chemical Linkers: Towards Better Biosensors and a New Generation of Medical Implants. Biophysical Reviews 2010 May; 2(2):55-65) and Kawakami et al. (Immobilization of Glucose Oxidase on Polymer Membranes Treated by Low-Temperature Plasma. Biotechnology and Bioengineering 1988 July, 32:369-373) teach the modification of material surfaces by plasma for immobilizing enzymes covalently with or without a chemical spacer. However, no work has been done immobilizing a thin layer of enzyme solution on surfaces, such as plasma treated surfaces.

U.S. Pat. No. 8,574,704 B2 (Smit et al.) uses an impregnated surface to generate a liquid layer on top of the surface for protecting the surface against fouling, ice formation, scale formation, and/or hydrate formation. It teaches producing a non-wetting surface that reduces or eliminates contact and interaction with the other fluid and liquid. It teaches that these non-wetting surfaces protect the solid from a harsh environment. This is in stark contrast with the current disclosure of a porous liquid which liquid impregnated surfaces were used not to reduce, but to increase, the contact between the liquid and the working fluid for enhanced separation and reaction. The solid substrate, when appropriately prepared and having high apparent surface area, is used to hold the liquid and to provide a high surface area liquid. This, in turn, enhances, not reduces, interfacial area between the liquid and working fluid. In addition, the porous liquid is not to protect the solid surfaces but to utilize solid surfaces to produce a useful high surface area liquid that can enhance separation and reaction without the need of rigorous mixing.

The article, "Liquid-Liquid Equilibria for Extraction of Furfural from Aqueous Solution Using Different Solvents," (Kun Xin et al., Fluid Phase Equilibria, volume 425, pgs. 393-401, 2016) teaches that a liquid toluene extraction is effective for separation of furfural from an aqueous solution. The authors utilized liquid-liquid extraction where an aqueous solution of furfural was mixed rigorously with toluene. Rigorous mixing, of course, is necessary to generate enough interfacial area between the two liquids for a better mass transport of furfural to toluene. In addition, after mass transport, the mixture was kept untouched for a substantial amount of time so that toluene and water could phase separate for final separation of the organic phase from the aqueous phase. This is in contrast with the current disclosure, where toluene was infused and kept on a polypropylene wool to generate a porous liquid toluene. The porous liquid toluene intrinsically possesses a high surface area, therefore it can produce high interfacial area between toluene and the aqueous solution of furfural. This, in turn, provides the needed mass transport of furfural from the aqueous solution to toluene without any rigorous mixing. Our disclosure also does not require any settling and phase separation of toluene and the aqueous solution.

The article, "Preparation and Characterization of Novel $CO_2$ 'Molecular Basket' Adsorbents Based on Polymer-Modified Mesoporous Molecular Sieve MCM-41," (Xiaochun Xu et al., Microporous and Mesoporous Materials, volume 62, issues 1-2, pgs. 29-45, 2003), and the article, "Capture of Carbon Dioxide From Flue Gas on TEPA-Grafted Metal-Organic Framework Mg2 (dobdc)," (Yan Cao et al., Journal of Environmental Sciences, volume 25, issue 10, pg. 2081, 2013) teach how to craft an amine polymer or TEPA (tetraethylenepe) in the pores of mesoporous powder materials such as zeolite MCM-41 and a metal-organic framework. The article, "Designing Adsorbents for $CO_2$ Capture From Flue Gas-Hyperbranced Aminosilicas Capable of Capturing $CO_2$ Reversibly," (Jason Hicks et al., Journal of American Chemical Society, volume 130, pg. 2902, 2008) teaches how to covalently bond amine molecules on solid surfaces to generate a nanoscale coating of amine for $CO_2$ separation. These contrast with the current disclosure where a solid surface with high apparent surface area was modified and then impregnated with a liquid. The liquid holds its natural liquid properties, as demonstrated in the examples in this disclosure, and can directly be in contact with the working fluid for effective separation and reaction.

The article, "Adsorption of Carbon Dioxide on Monoethanolamine (MEA)-Impregnated Kenaf Core Fiber by Pressure Swing Adsorption System," (Nabilah Zaini et al., Jurnal Teknologi, volume 68, number 5, pg. 11, 2014) teaches of impregnating of 300 micron chips of kenaf fiber by wetting the chips with a solution of MEA in methanol and then evaporating methanol. The MEA coats the internal surface of the fiber chips and helps to adsorb $CO_2$ reaching to capacity of 0.009 g of $CO_2$/g of MEA. The results fit well with the Langmuir and Freundich isotherms indicating surface adsorption. This is also in stark contrast with the current disclosure where liquid amine is impregnating the surface of solid structures with high apparent (excluding roughness) surface area such as quartz wool. Porous liquid preserves liquid properties for an effective separation. The liquid nature of a porous liquid provides absorption, not adsorption which is a surface effect. Absorption offers availability of every molecule in the liquid (not just the molecule on the surface, like adsorption) for effective separation. Porous liquid MEA, as noted in the examples of this disclosure, through absorption are able to remove 0.361 g of $CO_2$ per gram of MEA, which is 40× greater than the noted prior art.

An aspect or the present disclosure provides a porous liquid system or a porous liquid enzyme system that comprises a porous liquid or a porous liquid enzyme that includes: (1) a high surface area solid; and an encapsulating liquid or an infused liquid substantially covering the high surface area solid (e.g., at least 30% of the surface or surface area of the high surface area solid is coated or infused by the infused liquid and/or a PI greater than 150 m⁻¹); and (2) a fluid that is immiscible with the infused liquid and forms a liquid-fluid interface with the infused liquid. Another aspect of the present disclosure involves the immobilization of enzyme solution using a porous liquid, which can be utilized to efficiently catalyze reactions in which substrate is found within the working fluid.

In any aspect or embodiment described herein, the porous liquid system or porous liquid enzyme system may have a positive spreading number Sn (i.e., a spreading number greater than 0) for an encapsulation condition and spreading number between −0.5 and 0 for an infused condition, wherein:

$$S_n = \frac{\gamma_{SW} - \gamma_{OS} - \gamma_{OW}}{\gamma_{ow}};$$

wherein
$\gamma_{SW}$ is the interfacial tension between a high surface area solid phase and a fluid phase;
$\gamma_{OS}$ is the interfacial tension between an infused liquid phase and the high surface area solid phase; and
$\gamma_{OW}$ is the interfacial tension between the infused liquid phase and the fluid phase.

For example for an encapsulating condition, the spreading number of the porous liquid system or porous liquid enzyme system may be greater than 0, at least about 0.5, at least about 1.0, at least about 1.5, at least about 2.0, at least about 2.5, at least 3.0, at least 3.5, at least 4.0, at least 4.5, at least 5.0, at least 5.5, at least 6.0, at least 6.5, at least 7.0, at least 7.5, at least 8.0, at least 8.5, at least 9.0, at least 9.5, or at least 10.0.

The interfacial tension between a high surface area solid phase and a fluid phase may be determined by:

$$\gamma_{SW} = \gamma_S + \gamma_W - \sqrt[2]{\gamma_S^d \gamma_w^d} - \sqrt[2]{\gamma_s^p \gamma_w^p},$$

wherein
$\gamma_S$ is the surface tension of the high surface area solid phase;
$\gamma_W$ is the surface tension of the fluid phase;
$\gamma_S^d$ is the dispersive component of the surface tension of the high surface area solid phase;
$\gamma_S^p$ is the polar component of the surface tension of the high surface area solid phase;
$\gamma_W^d$ is the dispersive component of the surface tension of the fluid phase; and
$\gamma_W^p$ is the polar component of the surface tension of the fluid phase.

The interfacial tension between an impregnating liquid phase and the high surface area solid phase may be determined by:

$$\gamma_{OS} = \gamma_O + \gamma_S - \sqrt[2]{\gamma_O^d \gamma_S^d} - \sqrt[2]{\gamma_O^p \gamma_S^p},$$

wherein
$\gamma_O$ is the surface tension of the infused liquid phase;
$\gamma_S$ is the surface tension of the high surface area solid phase;
$\gamma_O^d$ is the dispersive component of the surface tension of the infused liquid phase;
$\gamma_O^p$ is the polar component of the surface tension of the infused liquid phase;
$\gamma_S^d$ is the dispersive component of the surface tension of the high surface area solid phase; and
$\gamma_S^p$ is the polar component of the surface tension of the high surface area solid phase.

The interfacial tension between the impregnating liquid and the fluid phase may be determined by:

$$\gamma_{OW} = \gamma_O + \gamma_W - \sqrt[2]{\gamma_O^d \gamma_W^d} - \sqrt[2]{\gamma_O^p \gamma_W^p},$$

wherein
$\gamma_O$ is the surface tension of the infused liquid phase;
$\gamma_W$ is the surface tension of the fluid phase;
$\gamma_O^d$ is the dispersive component of the surface tension of the infused liquid phase;
$\gamma_O^p$ is the polar component of the surface tension of the infused liquid phase;
$\gamma_W^d$ is the dispersive component of the surface tension of the fluid phase; and
$\gamma_W^p$ is the polar component of the surface tension of the fluid phase.

The surface tension of the high surface area solid phase may be determined by:

$$\gamma_S = \gamma_S^d + \gamma_S^p.$$

The surface tension of the impregnating liquid may be determined by:

$$\gamma_O = \gamma_O^d + \gamma_O^p.$$

The surface tension of the fluid phase may be determined by:

$$\gamma_W = \gamma_W^d + \gamma_W^p.$$

In some embodiments, the spreading number decreases as the concentration of the substance or substrate in the impregnating liquid increases. Thus, a decrease in the spreading number may be indicative of a decrease in the stability of the impregnating liquid covering the high surface area solid, the porous liquid system, or porous liquid enzyme system. As a result, the impregnating liquid covering the high surface area solid, the porous liquid system, or the porous liquid enzyme system may transition from stable to unstable as the positive spreading number approaches 0 and/or becomes less than −0.5.

Thus, the stability of the infused liquid covering the high surface area solid decreases as the concentration of the substance or substrate in the impregnating liquid increases. As a result, the impregnating liquid may become unstable when the concentration of the substance or substrate in the impregnating liquid reaches a threshold concentration during use. The unstable impregnating liquid may be readily displaced from the high surface area solid. Therefore, as discussed herein, contacting the unstable porous liquid or porous liquid enzyme with fresh impregnating liquid will replace the unstable impregnating liquid to form a stable porous liquid or porous liquid enzyme. In some embodiments, the used impregnating liquid is an impregnating liquid with a concentration of the substance or substrate that undergoes mass transfer that is: (1) greater than the fresh impregnating liquid; (2) above a threshold concentration that results in decreased transfer efficiency, decreased enzymatic activity, and/or a decrease in stability that results in displacement of the impregnating liquid, thereby decreasing transfer efficiency and/or enzymatic activity; (3) results in a spreading number that is less than or equal to 0 for an encapsulating condition and it is between −0.5 and 0 for an infused condition; or (4) a combination thereof.

It should be noted that the solid features or texture of any shape can be a part of the high surface area solid of the present disclosure. For example, the solid features or texture can be substantially spherical, substantially triangular, substantially rectangular, or a series of (e.g., 2, 3, 4, 5, 6, 7, 8, or 9) any combination of these shapes. Furthermore, based on the teachings of the present disclosure, one skilled in the art would be able to select the appropriate formula to be utilized to determine the appropriate combination of high surface area solid, impregnating liquid and working fluid to prepare a porous liquid system or porous liquid enzyme of the present disclosure.

High Surface Area Solid

Figure 2A:
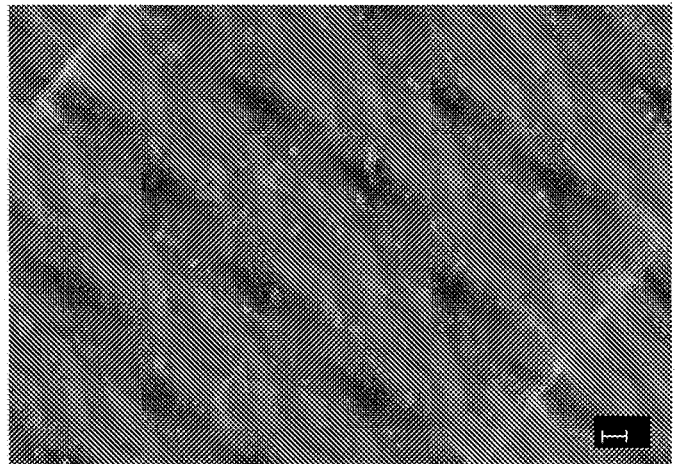
FIGS. 2A and 2B. Exemplary scanning electron micrographs of quartz wool fibers, which may be utilized to as the high surface area solid of the present disclosure in the preparation of a porous liquid or a porous liquid enzyme of the present disclosure.
Figure 2B:
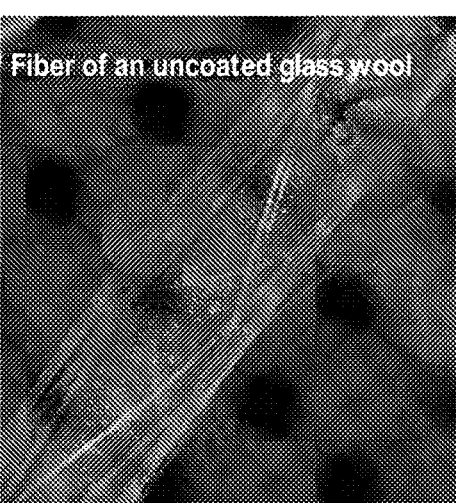

In some embodiments, the liquid film is able to encapsulate or infuse into, wet, and stably adhere within the surface of the high surface area solid and the liquid film is immiscible in the fluid that the porous liquid or porous liquid enzyme comes into contact with. The liquid film can infuse into and stably adhere to the high surface area solid if the solid has sufficient surface area and surface roughness, which may be accomplished with micro-texturing and/or nano-texturing. The high surface area solid may be activated prior to the application of the liquid film, to increase its physical or chemical affinity for the liquid and facilitate the infusion of the liquid film and its retention on the surface due to strong capillary forces. The degree of roughness and/or texture required to stably coat or cover the high surface area solid will depend on the formulation of the liquid film and the chemical make of the high surface area solid. For example, as shown in FIGS. 2A and 2B, as well as the Examples below, wools/fibers (such as quartz wool/fiber, polyethylene wool/fiber, etc.) have a roughness that is sufficient for use as a high surface area solid in certain embodiments of the present disclosure.

In certain aspects, the high surface area solid includes at least one of a rough surface, a textured surface, or both. Thus, a high surface area solid may be prepared with a surface that has a matrix of solid features or a rough surface. The matrix of solid features may include microstructures and/or nanostructures that protrude or extend from the surface of the high surface area solid. The texture (e.g., the micro-structures and/or nano-structures) may be applied to the surface of the high surface area solid. For example, particles may be applied to the surface. The particles may be randomly spaced, dispersed, and/or distributed on the surface of the high surface area solid. In some embodiments, the particles are uniformly dispersed/distributed on the surface of the high surface area solid. The particles may be spray-deposited (e.g., deposited by aerosol or other spray mechanism).

Figure 3:
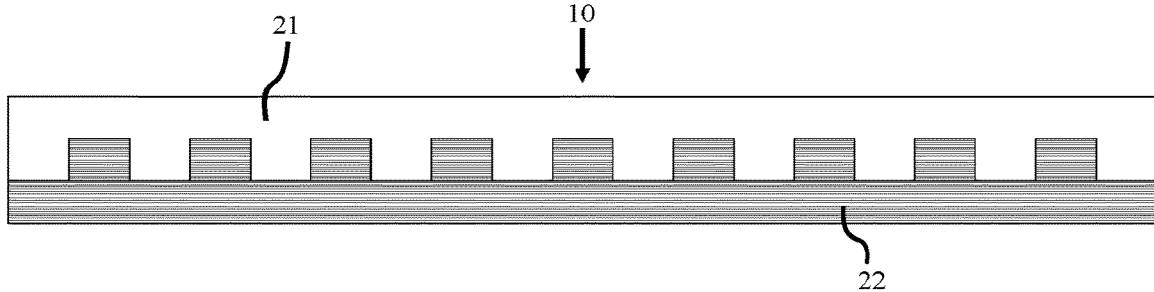
FIG. 3. Schematic diagrams of exemplary porous liquid and porous liquid enzyme of the present disclosure. As shown by FIG. 3, the porous liquid or porous liquid enzyme (10) includes a liquid film (21) that substantially covers the high surface area solid (22). This is an example and in any embodiment described herein, the liquid film may not completely cover the solid features but merely be infused between the solid features of the high surface area solid. The space located between the features may include the liquid film (21), a fluid or gas, or a combination thereof.

As shown by FIG. 3, the porous liquid or porous liquid enzyme (10) includes a liquid film (21) that substantially covers the high surface area solid (22). As shown in FIG. 3, the liquid may be found between the features of the high surface area solid (22). FIG. 3 is only illustrative of the concepts of the present disclosure; one skilled in the art appreciates that modifications to the porous liquid or porous liquid enzyme of the present disclosure are contemplated and within the scope of the present disclosure The solid features (e.g., micro-structures and/or nano-structures) may have an average characteristic dimension (i.e., length for roughly rod-shaped objects, thickness, depth, height, or combinations thereof) of about 0.1 µm to about 1000 µm (e.g., about 1 µm to about 200 µm or about 10 µm to about 50 µm). For example, the average characteristic dimension of the solid features may be about 0.1 µm to about 1000 µm, about 0.1 µm to about 900 µm, about 0.1 µm to about 800 µm, about 0.1 µm to about 700 µm, about 0.1 µm to about 600 µm, about 0.1 µm to about 500 µm, about 0.1 µm to about 400 µm, about 0.1 µm to about 300 µm, about 0.1 µm to about 200 µm, about 0.1 µm to about 100 µm, about 0.1 µm to about 50 µm, about 25 µm to about 1000 µm, about 25 µm to about 900 µm, about 25 µm to about 800 µm, about 25 µm to about 700 µm, about 25 µm to about 600 µm, about 25 µm to about 500 µm, about 25 µm to about 400 µm, about 25 µm to about 300 µm, about 25 µm to about 200 µm, about 25 µm to about 100 µm, about 75 µm to about 1000 µm, about 75 µm to about 900 µm, about 75 µm to about 800 µm, about 75 µm to about 700 µm, about 75 µm to about 600 µm, about 75 µm to about 500 µm, about 75 µm to about 400 µm, about 75 µm to about 300 µm, about 75 µm to about 200 µm, about 150 µm to about 1000 µm, about 150 µm to about 900 µm, about 150 µm to about 800 µm, about 150 µm to about 700 µm, about 150 µm to about 600 µm, about 150 µm to about 500 µm, about 150 µm to about 400 µm, about 150 µm to about 300 µm, about 300 µm to about 1000 µm, about 300 µm to about 900 µm, about 300 µm to about 800 µm, about 300 µm to about 700 µm, about 300 µm to about 600 µm, about 300 µm to about 500 µm, about 300 µm to about 400 µm, about 400 µm to about 1000 µm, about 400 µm to about 900 µm, about 400 µm to about 800 µm, about 400 µm to about 700 µm, about 400 µm to about 600 µm, about 400 µm to about 500 µm, about 500 µm to about 1000 µm, about 500 µm to about 900 µm, about 500 µm to about 800 µm, about 500 µm to about 700 µm, about 500 µm to about 600 µm, about 600 µm to about 1000 µm, about 600 µm to about 900 µm, about 600 µm to about 800 µm, about 600 µm to about 700 µm, about 700 µm to about 1000 µm, about 700 µm to about 900 µm, about 700 µm to about 800 µm, about 800 µm to about 1000 µm, about 800 µm to about 900 µm, or about 900 µm to about 1000 µm.

In some embodiments, the solid features (e.g., microstructures and/or nano-structures) are arranged with average spacing of about 0.1 µm to about 500 µm (e.g., about 5 µm to about 200 µm or about 10 µm to about 30 µm). For example, the average space between solid features may be about 0.1 µm to about 500 µm, about 0.1 µm to about 500 µm, about 0.1 µm to about 450 µm, about 0.1 µm to about 400 µm, about 0.1 µm to about 350 µm, about 0.1 µm to about 300 µm, about 0.1 µm to about 250 µm, about 0.1 µm to about 200 µm, about 0.1 µm to about 150 µm, about 0.1 µm to about 100 µm, about 0.1 µm to about 50 µm, about 0.1 µm to about 30 µm, about 1 µm to about 500 µm, about 1 µm to about 450 µm, about 1 µm to about 400 µm, about 1 µm to about 350 µm, about 1 µm to about 300 µm, about 1 µm to about 250 µm, about 1 µm to about 200 µm, about 1 µm to about 150 µm, about 1 µm to about 100 µm, about 1 µm to about 50 µm, about 1 µm to about 30 µm, about 5 µm to about 500 µm, about 5 µm to about 450 µm, about 5 µm to about 400 µm, about 5 µm to about 350 µm, about 5 µm to about 300 µm, about 5 µm to about 250 µm, about 5 µm to about 200 µm, about 5 µm to about 150 µm, about 5 µm to about 100 µm, about 5 µm to about 50 µm, about 5 µm to about 30 µm, about 10 µm to about 500 µm, about 10 µm to about 450 µm, about 10 µm to about 400 µm, about 10 µm to about 350 µm, about 10 µm to about 300 µm, about 10 µm to about 250 µm, about 10 µm to about 200 µm, about 10 µm to about 150 µm, about 10 µm to about 100 µm, about 10 µm to about 50 µm, about 25 µm to about 500 µm, about 25 µm to about 450 µm, about 25 µm to about 400 µm, about 25 µm to about 350 µm, about 25 µm to about 300 µm, about 25 µm to about 250 µm, about 25 µm to about 200 µm, about 25 µm to about 150 µm, about 25 µm to about 100 µm, about 50 µm to about 500 µm, about 50 µm to about 450 µm, about 50 µm to about 400 µm, about 50 µm to about 350 µm, about 50 µm to about 300 µm, about 50 µm to about 250 µm, about 50 µm to about 200 µm, about 50 µm to about 150 µm, about 50 µm to about 100 µm, about 100 µm to about 500 µm, about 100 µm to about 450 µm, about 100 µm to about 400 µm, about 100 µm to about 350 µm, about 100 µm to about 300 µm, about 100 µm to about 250 µm, about 100 µm to about 200 µm, about 100 µm to about 150 µm, about 150 µm to about 500 µm, about 150 µm to about 450 µm, about 150 µm to about 400 µm, about 150 µm to about 350 µm, about 150 µm to about 300 µm, about 150 µm to about 250 µm, about 150 µm to about 200 µm, about 200 µm to about 500 µm, about 200 µm to about 450 µm, about 200 µm to about 400 µm, about 200 µm to about 350 µm, about 200 µm to about 300 µm, about 200 µm to about 250 µm, about 250 µm to about 500 µm, about 250 µm to about 450 µm, about 250 µm to about 400 µm, about 250 µm to about 350 µm, about 250 µm to about 300 µm, about 300 µm to about 500 µm, about 300 µm to about 450 µm, about 300 µm to about 400 µm, about 300 µm to about 350 µm, about 350 µm to about 500 µm, about 350 µm to about 450 µm, about 350 µm to about 400 µm, about 400 µm to about 500 µm, or about 450 µm to about 500 µm.

In some embodiments, the solid features are rough. Surface area and surface roughness can be measured using mercury porosimetry. Surface roughness can also be measured using the Wenzel model. In the Wenzel model, a dimensionless roughness factor, r, is expressed as the ratio of the cos of the contact angle of a wetting liquid on a solid surface that is rough over the cos of the contact angle of the same wetting liquid on the same solid surface that is smooth. The high surface area solids disclosed herein can have a Wenzel roughness factor, r, of 1.1 to about 10. Various methods of imparting a surface texture (e.g., roughness and/or porosity) to the high surface area solid may be utilized. For example, the texture or roughness may be imparted by exposing the high surface area solid (e.g., polycarbonate) to a solvent (e.g., acetone). The solvent may impart texture by inducing crystallization (e.g., polycarbonate may recrystallize when exposed to acetone).

The texture or roughness, such as solid features may be imparted through extrusion, electrospinning, or blow-molding of a mixture of materials (e.g., glass, polyethylene, a continuous polymer blend, or mixture of a polymer and particles). One of the materials may be subsequently dissolved, etched, melted, or evaporated away, leaving a textured, porous, and/or rough surface behind. In some embodiments, one of the materials is in the form of particles that are larger than an average thickness of the infused liquid film.

The texture or roughness may be imparted by mechanical roughening (e.g., tumbling with an abrasive), spray-coating or polymer spinning, and/or deposition of particles from solution (e.g., layer-by-layer deposition, evaporating away liquid from a suspension of liquid and particles). Other possible methods for imparting the texture or roughness include: deposition of a polymer from a solution (e.g., the polymer forms a rough, porous, or textured surface behind); extrusion or blow-molding of a material that expands upon cooling, leaving a wrinkled surface (e.g., wool, including glass wool, polyethylene wool, quartz wool, and other fibers); and application of a layer of a material onto a surface that is under tension or compression, and subsequently relaxing the tension or compression of surface beneath, resulting in a textured surface.

In some embodiments, the surface of the high surface area solid may be roughened.

In any embodiment herein, the surface area of the high surface area solid may be the apparent surface area, which is defined herein as the total geometric area of the solid if there were no roughness on the surface. For example, the apparent surface area of each filament in the exemplary 3D structure in FIG. 6 is the surface area of the filament if it were smooth. The apparent surface area of the base of the exemplary 3D structure in FIG. 6 is the surface area of the base if it were smooth. The apparent surface area of the entire high surface area solid is the sum of the apparent surface area of each filament plus the apparent surface area of the base.

In some embodiments, the surface area or apparent surface area of the high surface area solid is greater than about 0.001 m²/g, greater than about 0.01 m²/g, greater than about 0.1 m²/g, or 15 greater than about 0.2 m²/g. For example, the high surface area solid has a surface area or apparent surface area of about 0.001 m²/g to 45 m²/g, about 0.001 m²/g to 40 m²/g, about 0.001 m²/g to 35 m²/g, about 0.001 m²/g to 30 m²/g, about 0.001 m²/g to 25 m²/g, about 0.001 m²/g to 20 m²/g, about 0.001 m²/g to 15 m²/g, about 0.001 m²/g to 10 m²/g, about 0.001 m²/g to 5 m²/g, about 0.001 m²/g to 1.0 m²/g, about 0.01 m²/g to 45 m²/g, about 0.01 m²/g to 40 m²/g, about 0.01 m²/g to 35 m²/g, about 0.01 m²/g to 30 m²/g, about 0.01 m²/g to 25 m²/g, about 0.01 m²/g to 20 m²/g, about 0.01 m²/g to 15 m²/g, about 0.01 m²/g to 10 m²/g, about 0.01 m²/g to 5 m²/g, about 0.01 m²/g to 1.0 m²/g, about 0.1 m²/g to about 45 m²/g, about 0.1 m²/g to about 40 m²/g, about 0.1 m²/g to about 35 m²/g, about 0.1 m²/g to about 30 m²/g, about 0.1 m²/g to about 25 m²/g, about 0.1 m²/g to about 20 m²/g, about 0.1 m²/g to about 15 m²/g, about 0.1 m²/g to about 10 m²/g, about 0.2 m²/g to about 45 m²/g, about 0.2 m²/g to about 40 m²/g, about 0.2 m²/g to about 35 m²/g, about 0.2 m²/g to about 30 m²/g, about 0.2 m²/g to about 25 m²/g, about 0.2 m²/g to about 20 m²/g, about 0.2 m²/g to about 15 m²/g, about 0.2 m²/g to about 10 m²/g, about 0.5 m²/g to about 45 m²/g, about 0.5 m²/g to about 40 m²/g, about 0.5 m²/g to about 35 m²/g, about 0.5 m²/g to about 30 m²/g, about 0.5 m²/g to about 25 m²/g, about 0.5 m²/g to about 20 m²/g, about 0.5 m²/g to about 15 m²/g, about 0.5 m²/g to about 10 m²/g, about 5 m²/g to about 45 m²/g, about 5 m²/g to about 40 m²/g, about 5 m²/g to about 35 m²/g, about 5 m²/g to about 30 m²/g, about 5 m²/g to about 25 m²/g, about 5 m²/g to about 20 m²/g, about 5 m²/g to about 15 m²/g, about 10 m²/g to about 45 m²/g, about 10 m²/g to about 40 m²/g, about 10 m²/g to about 35 m²/g, about 10 m²/g to about 30 m²/g, about 10 m²/g to about 25 m²/g, about 10 m²/g to about 20 m²/g, about 15 m²/g to about 45 m²/g, about 15 m²/g to about 40 m²/g, about 15 m²/g to about 35 m²/g, about 15 m²/g to about 30 m²/g, about 15 m²/g to about 25 m²/g, about 20 m²/g to about 45 m²/g, about 20 m²/g to about 40 m²/g, about 20 m²/g to about 35 m²/g, about 20 m²/g to about 30 m²/g, about 25 m²/g to about 45 m²/g, about 25 m²/g to about 40 m²/g, about 25 m²/g to about 35 m²/g, about 30 m²/g to about 45 m²/g, about 30 m²/g to about 40 m²/g, or about 35 m²/g to about 40 m²/g.

The present disclosure provides a high surface area device capable of continuously refreshing an infused or encapsulating liquid. The high surface area device comprises: a reservoir having an exterior surface and configured to contain or hold fresh or unused infused or encapsulating liquid therein, wherein at least one side of the exterior surface includes (1) solid features (e.g., elongated solid features or pillars) extending outward therefrom and (2) at least one opening (e.g., a plurality of openings) that allows the fresh or unused infused liquid to flow from the reservoir to the solid features.

The shape of the reservoir may be any appropriate shape for the intended purpose e.g., designed to fit in a particular device, etc. For example, the reservoir may be a prism, such as a triangular prism, square prism, rectangular prism, pentagonal prism, circular prism (cylinder), etc. For example, the reservoir may have a top, bottom and at least one side (i.e., a single arcing side could be used to form a circular prism or a flat side and an arced side could form a two sided prism). Similarly, the top and/or bottom surfaces of the reservoir need not be a flat with the caveat that at least one side of the surface of the reservoir has a substantially flat surface in which the solid features are attached and extend outward from. It should be noted that the use of terms "top" and "bottom" are not intended to be limiting, but rather merely represent two additional sides, which may have any contour for the intended use (e.g., each of the top and bottom can independently be flat, hemispherical, etc.) and are utilized merely to facilitate the description of the reservoir of the present disclosure.

Figure 5A:
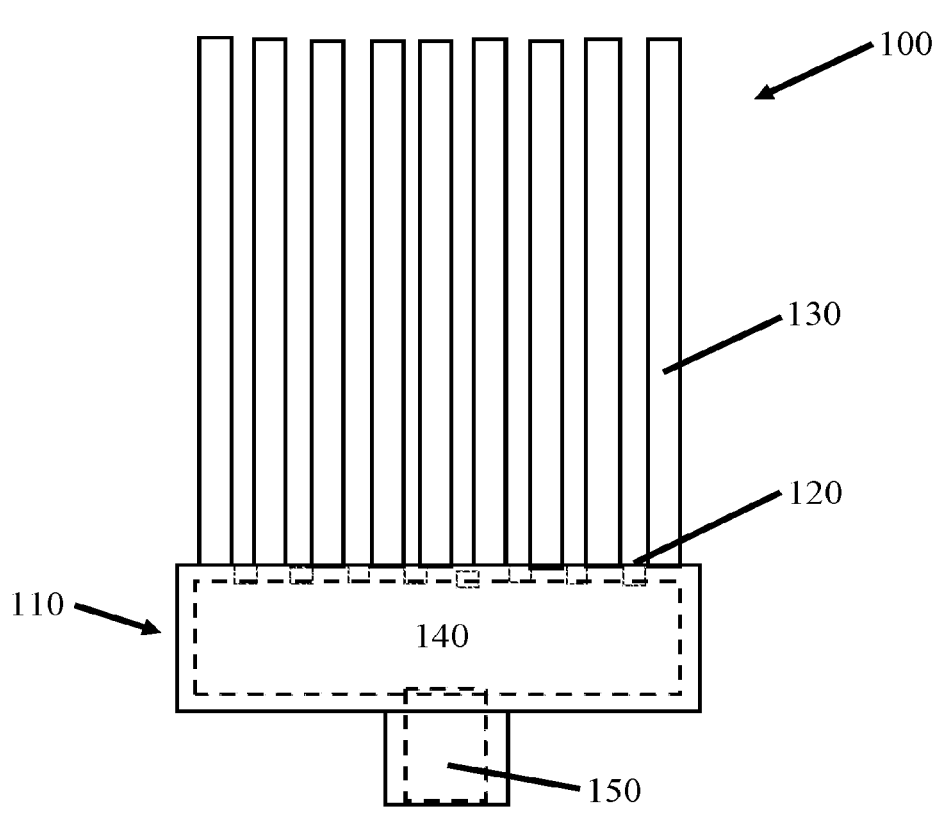
FIGS. 5A and 5B.
Figure 5B:
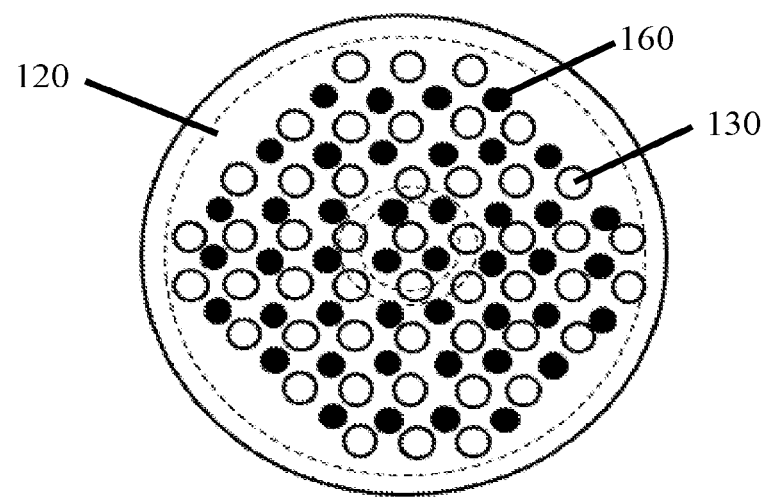

For example, FIGS. 5A and 5B illustrate an exemplary high surface area device capable of continuously refreshing an infused liquid (100), which includes a plurality of solid features or pillars (130) extending outward from a surface (120) of the exterior surface of the reservoir (110). In this particular exemplary embodiment, the pillars (130) are extending upward from a top surface (120). The solid features, however, could extend from any of the exterior surfaces of the reservoir (110). The reservoir (110) is configured to contain, hold or store the infused liquid. For example, as shown in FIG. 5A, the reservoir includes a chamber (140) that distributes the infused liquid of the present disclosure to the plurality of openings (160 in FIG. 5B). The chamber (140) may be configured to hold a quantity of infused liquid. The high surface area device may include at least one inlet (150). Each individual inlet may supply at least one of fresh or unused infused liquid, pressure, or a combination thereof. Pressure may be utilized to expel the infused liquid from the reservoir (110) or chamber (140) through the openings (160) to enhance the replenishment/exchange of the infused liquid coating the solid features of the high surface area device. In certain embodiments, sufficient pressure may be applied to propel the infused liquid from the openings (160), thereby enhancing the replenishment/exchange of the infused liquid coating the solid features of the high surface area device.

Each side of the exterior surface of the reservoir (as discussed above, including the top and bottom) may have at least about 5 solid features, at least about 10 solid features, at least about 15 solid features, at least about 20 solid features, at least about 25 solid features, at least about 30 solid features, at least about 35 solid features, at least about 40 solid features, at least about 45 solid features, at least about 50 solid features, at least about 55 solid features, at least about 60 solid features, at least about 65 solid features, at least about 70 solid features, at least about 75 solid features, about 5 to about 100 solid features, about 5 to about 90 solid features, about 5 to about 80 solid features, about 5 to about 70 solid features, about 5 to about 60 solid features, about 5 to about 50 solid features, about 5 to about 40 solid features, about 5 to about 30 solid features, about 5 to about 20 solid features, about 10 to about 100 solid features, about 10 to about 90 solid features, about 10 to about 80 solid features, about 10 to about 70 solid features, about 10 to about 60 solid features, about 10 to about 50 solid features, about 10 to about 40 solid features, about 10 to about 30 solid features, about 20 to about 100 solid features, about 20 to about 90 solid features, about 20 to about 80 solid features, about 20 to about 70 solid features, about 20 to about 60 solid features, about 20 to about 50 solid features, about 20 to about 40 solid features, about 30 to about 100 solid features, about 30 to about 90 solid features, about 30 to about 80 solid features, about 30 to about 70 solid features, about 30 to about 60 solid features, about 30 to about 50 solid features, about 40 to about 100 solid features, about 40 to about 90 solid features, about 40 to about 80 solid features, about 40 to about 70 solid features, about 40 to about 60 solid features, about 50 to about 100 solid features, about 50 to about 90 solid features, about 50 to about 80 solid features, about 50 to about 70 solid features, about 60 to about 100 solid features, about 60 to about 90 solid features, about 60 to about 80 solid features, about 70 to about 100 solid features, about 70 to about 90 solid features, or about 80 to about 100 solid features.

The solid features of the high surface area device have any of the characteristics and/or features of the higher surface area solids of the present disclosure. The solid features may have any width and/or length that is/are appropriate for the intended use. In certain embodiments, the solid features have a width of about 1 μm to about 10 mm. For example, the solid features may have a width of about 1 μm to about 10 mm, about 1 μm to about 9 mm, about 1 μm to about 8 mm, about 1 μm to about 7 mm, about 1 μm to about 6 mm, about 1 μm to about 5 mm, about 1 μm to about 4 mm, about 1 μm to about 3 mm, about 1 μm to about 2 mm, about 1 μm to about 1 mm, about 1 μm to about 500 μm, about 1 μm to about 100 μm, about 10 μm to about 10 mm, about 10 μm to about 9 mm, about 10 μm to about 8 mm, about 10 μm to about 7 mm, about 10 μm to about 6 mm, about 10 μm to about 5 mm, about 10 μm to about 4 mm, about 10 μm to about 3 mm, about 10 μm to about 2 mm, about 10 μm to about 1 mm, about 10 μm to about 500 μm, about 10 μm to about 100 μm, about 100 μm to about 10 mm, about 100 μm to about 9 mm, about 100 μm to about 8 mm, about 100 μm to about 7 mm, about 100 μm to about 6 mm, about 100 μm to about 5 mm, about 100 μm to about 4 mm, about 100 μm to about 3 mm, about 100 μm to about 2 mm, about 100 μm to about 1 mm, about 100 μm to about 500 μm, about 500 μm to about 10 mm, about 500 μm to about 9 mm, about 500 μm to about 8 mm, about 500 μm to about 7 mm, about 500 μm to about 6 mm, about 500 μm to about 5 mm, about 500 μm to about 4 mm, about 500 μm to about 3 mm, about 500 μm to about 2 mm, about 500 μm to about 1 mm, about 1 mm to about 10 mm, about 1 mm to about 9 mm, about 1 mm to about 8 mm, about 1 mm to about 7 mm, about 1 mm to about 6 mm, about 1 mm to about 5 mm, about 1 mm to about 4 mm, about 1 mm to about 3 mm, about 1 mm to about 2 mm, about 2 mm to about 10 mm, about 2 mm to about 9 mm, about 2 mm to about 8 mm, about 2 mm to about 7 mm, about 2 mm to about 6 mm, about 2 mm to about 5 mm, about 2 mm to about 4 mm, about 2 mm to about 3 mm, about 3 mm to about 10 mm, about 3 mm to about 9 mm, about 3 mm to about 8 mm, about 3 mm to about 7 mm, about 3 mm to about 6 mm, about 3 mm to about 5 mm, about 3 mm to about 4 mm, about 4 mm to about 10 mm, about 4 mm to about 9 mm, about 4 mm to about 8 mm, about 4 mm to about 7 mm, about 4 mm to about 6 mm, about 4 mm to about 5 mm, about 5 mm to about 10 mm, about 5 mm to about 9 mm, about 5 mm to about 8 mm, about 5 mm to about 7 mm, about 5 mm to about 6 mm, about 6 mm to about 10 mm, about 6 mm to about 9 mm, about 6 mm to about 8 mm, about 6 mm to about 7 mm, about 7 mm to about 10 mm, about 7 mm to about 9 mm, about 7 mm to about 8 mm, about 8 mm to about 10 mm, or about 9 mm to about 10 mm.

In particular embodiments, the solid features have a length that is no greater than about 100 times the width of the solid features. For example, the length of the solid feature may be no greater than 90 times, no greater than 80 times, no greater than 70 times, no greater than 60 times, no greater than 50 times, no greater than 40 times, no greater than 30 times, no greater than 20 times, no greater than 10 times, about 1 to about 100 times, about 1 to about 90 times, about 1 to about 80 times, about 1 to about 70 times, about 1 to about 60 times, about 1 to about 50 times, about 1 to about 40 times, about 1 to about 30 times, about 1 to about 20 times, about 1 to about 10 times, about 10 to about 100 times, about 10 to about 90 times, about 10 to about 80 times, about 10 to about 70 times, about 10 to about 60 times, about 10 to about 50 times, about 10 to about 40 times, about 10 to about 30 times, about 10 to about 20 times, about 20 to about 100 times, about 20 to about 90 times, about 20 to about 80 times, about 20 to about 70 times, about 20 to about 60 times, about 20 to about 50 times, about 20 to about 40 times, about 20 to about 30 times, about 30 to about 100 times, about 30 to about 90 times, about 30 to about 80 times, about 30 to about 70 times, about 30 to about 60 times, about 30 to about 50 times, about 30 to about 40 times, about 40 to about 100 times, about 40 to about 90 times, about 40 to about 80 times, about 40 to about 70 times, about 40 to about 60 times, about 40 to about 50 times, about 50 to about 100 times, about 50 to about 90 times, about 50 to about 80 times, about 50 to about 70 times, about 50 to about 60 times, about 60 to about 100 times, about 60 to about 90 times, about 60 to about 80 times, about 60 to about 70 times, about 70 to about 100 times, about 70 to about 90 times, about 70 to about 80 times, about 80 to about 100 times, about 80 to about 90 times, or about 90 to about 100 times the width.

The solid features may be spaced as appropriate for the intended use. In certain embodiments, the solid features are about 10 μm to about 1,000 μm apart from each other. For example, the solid features may be no greater than 1,000 μm, no greater than 900 μm, no greater than 800 μm, no greater than 700 μm, no greater than 600 μm, no greater than 500 μm, no greater than 400 μm, no greater than 300 μm, no greater than 200 μm, no greater than 100 μm, about 10 to about 1,000 μm, about 10 to about 900 μm, about 10 to about 800 μm, about 10 to about 700 μm, about 10 to about 600 μm, about 10 to about 500 μm, about 10 to about 400 μm, about 10 to about 300 μm, about 10 to about 200 μm, about 10 to about 100 μm, about 100 to about 1,000 μm, about 100 to about 900 μm, about 100 to about 800 μm, about 100 to about 700 μm, about 100 to about 600 μm, about 100 to about 500 μm, about 100 to about 400 μm, about 100 to about 300 μm, about 100 to about 200 μm, about 200 to about 1,000 μm, about 200 to about 900 μm, about 200 to about 800 μm, about 200 to about 700 μm, about 200 to about 600 μm, about 200 to about 500 μm, about 200 to about 400 μm, about 200 to about 300 μm, about 300 to about 1,000 μm, about 300 to about 900 μm, about 300 to about 800 μm, about 300 to about 700 μm, about 300 to about 600 μm, about 300 to about 500 μm, about 300 to about 400 μm, about 400 to about 1,000 μm, about 400 to about 900 μm, about 400 to about 800 μm, about 400 to about 700 μm, about 400 to about 600 μm, about 400 to about 500 μm, about 500 to about 1,000 μm, about 500 to about 900 μm, about 500 to about 800 μm, about 500 to about 700 μm, about 500 to about 600 μm, about 600 to about 1,000 μm, about 600 to about 900 μm, about 600 to about 800 μm, about 600 to about 700 μm, about 700 to about 1,000 μm, about 700 to about 900 μm, about 700 to about 800 μm, about 800 to about 1,000 μm, about 800 to about 900 μm, or about 900 to about 1,000 μm apart from each other.

Each side of the exterior surface of the reservoir (as discussed above, including the top and bottom) having solid features may have at least about 5 openings, at least about 10 openings, at least about 15 openings, at least about 20 openings, at least about 25 openings, at least about 30 openings, at least about 35 openings, at least about 40 openings, at least about 45 openings, at least about 50 openings, at least about 55 openings, about least about 60 openings, at least about 65 openings, at least about 70 openings, at least about 75 openings, about 5 to about 100 openings, about 5 to about 90 openings, about 5 to about 80 openings, about 5 to about 70 openings, about 5 to about 60 openings, about 5 to about 50 openings, about 5 to about 40 openings, about 5 to about 30 openings, about 5 to about 20 openings, about 10 to about 100 openings, about 10 to about 90 openings, about 10 to about 80 openings, about 10 to about 70 openings, about 10 to about 60 openings, about 10 to about 50 openings, about 10 to about 40 openings, about 10 to about 30 openings, about 20 to about 100 openings, about 20 to about 90 openings, about 20 to about 80 openings, about 20 to about 70 openings, about 20 to about 60 openings, about 20 to about 50 openings, about 20 to about 40 openings, about 30 to about 100 openings, about 30 to about 90 openings, about 30 to about 80 openings, about 30 to about 70 openings, about 30 to about 60 openings, about 30 to about 50 openings, about 40 to about 100 openings, about 40 to about 90 openings, about 40 to about 80 openings, about 40 to about 70 openings, about 40 to about 60 openings, about 50 to about 100 openings, about 50 to about 90 openings, about 50 to about 80 openings, about 50 to about 70 openings, about 60 to about 100 openings, about 60 to about 90 openings, about 60 to about 80 openings, about 70 to about 100 openings, about 70 to about 90 openings, or about 80 to about 100 openings.

The openings may have any shape that is appropriate for the intended use. For example, the openings may be circular, oval, elliptical, polygonal, triangle, square, rectangular, pentagon, and so on. Furthermore, the openings may have any dimension that is/are appropriate for intended use. In certain embodiments, the width of an opening may be no greater than 1,000 μm. For example, the width of the opening may be no greater than 1,000 μm, no greater than 900 μm, no greater than 800 μm, no greater than 700 μm, no greater than 600 μm, no greater than 500 μm, no greater than 400 μm, no greater than 300 μm, no greater than 200 μm, no greater than 100 μm, about 1 to about 1,000 μm, about 1 to about 900 μm, about 1 to about 800 μm, about 1 to about 700 μm, about 1 to about 600 μm, about 1 to about 500 μm, about 1 to about 400 μm, about 1 to about 300 μm, about 1 to about 200 μm, about 1 to about 100 μm, about 10 to about 1,000 μm, about 10 to about 900 μm, about 10 to about 800 μm, about 10 to about 700 μm, about 10 to about 600 μm, about 10 to about 500 µm, about 10 to about 400 µm, about 10 to about 300 µm, about 10 to about 200 µm, about 10 to about 100 µm, about 100 to about 1,000 µm, about 100 to about 900 µm, about 100 to about 800 µm, about 100 to about 700 µm, about 100 to about 600 µm, about 100 to about 500 µm, about 100 to about 400 µm, about 100 to about 300 µm, about 100 to about 200 µm, about 200 to about 1,000 µm, about 200 to about 900 µm, about 200 to about 800 µm, about 200 to about 700 µm, about 200 to about 600 µm, about 200 to about 500 µm, about 200 to about 400 µm, about 200 to about 300 µm, about 300 to about 1,000 µm, about 300 to about 900 µm, about 300 to about 800 µm, about 300 to about 700 µm, about 300 to about 600 µm, about 300 to about 500 µm, about 300 to about 400 µm, about 400 to about 1,000 µm, about 400 to about 900 µm, about 400 to about 800 µm, about 400 to about 700 µm, about 400 to about 600 µm, about 400 to about 500 µm, about 500 to about 1,000 µm, about 500 to about 900 µm, about 500 to about 800 µm, about 500 to about 700 µm, about 500 to about 600 µm, about 600 to about 1,000 µm, about 600 to about 900 µm, about 600 to about 800 µm, about 600 to about 700 µm, about 700 to about 1,000 µm, about 700 to about 900 µm, about 700 to about 800 µm, about 800 to about 1,000 µm, about 800 to about 900 µm, or about 900 to about 1,000 µm.

Like the shape, the dimensions (e.g., length, wide, and/or height) of the reservoir can be designed to suit the needs of its particular use. In some embodiments, at least one of the length, width, or both of the reservoir is at least about 0.1 mm. For example, at least one of the length, width (e.g., diameter of a circle), or both is at least about 0.2 mm, at least about 0.3 mm, at least about 0.4 mm, at least about 0.5 mm, at least about 0.6 mm, at least about 0.7 mm, at least about 0.8 mm, at least about 0.9 mm, or at least about 1.0 mm. In certain embodiments, the height of the reservoir is at least about 0.1 mm. For example, the height of the reservoir is at least about 0.2 mm, at least about 0.3 mm, at least about 0.4 mm, at least about 0.5 mm, at least about 0.6 mm, at least about 0.7 mm, at least about 0.8 mm, at least about 0.9 mm, or at least about 1.0 mm. Again, the shape and size of the reservoir can be any shape and size that is appropriate for the intended use, such as the enclosure in which it may be located.

The high surface area solid, high surface area solid device, or solid features thereof may be prepared through additive manufacturing. For example, any additive manufacturing technique known (such as VAT polymerization, material jetting, binder jetting or 3D printing, material extrusion, powder bed fusion, sheet lamination, directed energy deposition, laser metal deposition, or the like) may be utilized to prepare the high surface area solid of the present disclosure (such as the solid features of the high surface area solid device) and/or the high surface area solid device of the present disclosure. While additive manufacturing provides an elegant method of producing the high surface area solid and high surface area solid device, those of ordinary skill in the art will appreciate that the articles of the present disclosure may be prepared/manufactured by any appropriate method.

Liquid Film or Infused or Encapsulating Liquid

In some embodiments, the liquid film is formulated to extract at least one substance from a fluid or working fluid. In some embodiments, the working fluid and the liquid film are immiscible. The liquid film and working fluid may be selected such that contaminants from the working fluid are extracted from and/or absorbed by the liquid film (e.g., by mass transfer).

For example, the liquid film can include at least one of an amine, monoethanolamine, tetraethylenepentamine, an alkali metal hydroxide (e.g., potassium hydroxide, sodium hydroxide, lithium hydroxide, rubidium hydroxide, cesium hydroxide, or combinations thereof), potassium hydroxide, sodium hydroxide, lithium hydroxide, or combinations thereof. A porous liquid with one of the aforementioned compounds may be used to extract carbon dioxide from a gaseous mixture (such as flue gas, or a chemical or refinery gas). The liquid film could include glycol, triethylene glycol, or combination thereof a porous liquid with the aforementioned compounds may be used to extract water from a wet natural gas.

In some embodiments, the stability of the impregnating liquid decreases as the concentration of the substance and/or substrate in the infused or encapsulating liquid increases. As a result, the infused or encapsulating liquid may become unstable when the concentration of the substance or substrate in the infused or encapsulating liquid reaches a threshold concentration. The spent or used infused or encapsulating liquid may then be readily displaced from the high surface area solid. Contacting the unstable porous liquid or porous liquid enzyme with fresh infused or encapsulating liquid will result in the replacement of the unstable used infused or encapsulating liquid to form a stable porous liquid or porous liquid enzyme. The used or spent infused or encapsulating liquid has a concentration of the substance or substrate that undergoes a mass transfer that is: (1) greater than the fresh or unused infused or encapsulating liquid; (2) above a threshold concentration that results in decreased transfer efficiency, decreased enzymatic activity, and/or a decrease in stability that results in displacement of the infused liquid, thereby decreasing transfer efficiency and/or enzymatic activity; (3) results in a spreading number that is less than or equal to 0 for an encapsulation condition and spreading number between –0.5 and 0 for an infused condition; or (4) a combination thereof.

In some embodiments, the liquid film has a thickness from the bottom of the roughness or the texture to the top surface of the liquid film no greater than 1400 µm (e.g. a thickness no greater than 1000 µm, about 10 µm to about 1000 µm, or about 10 µm to about 100 µm). For example, in any aspect or embodiment described herein, the thickness of the liquid film on substantially covering the high surface area solid is ≤1400 µm, ≤1300 µm, ≤1200 µm, ≤1100 µm, ≤1000 µm, ≤900 µm, ≤800 µm, ≤700 µm, ≤600 µm, ≤500 µm, ≤400 µm, ≤300 µm, ≤200 µm, ≤100 µm, about 10 µm to about 1400 µm, about 10 µm to about 1200 µm, about 10 µm to about 1000 µm, about 10 µm to about 800 µm, about 10 µm to about 900 µm, about 10 µm to about 700 µm, about 10 µm to about 600 µm, about 10 µm to about 500 µm, about 10 µm to about 400 µm, about 10 µm to about 300 µm, about 10 µm to about 200 µm, about 10 µm to about 100 µm, about 100 µm to about 1400 µm, about 100 µm to about 1200 µm, about 100 µm to about 1000 µm, about 100 µm to about 800 µm, about 100 µm to about 900 µm, about 100 µm to about 700 µm, about 100 µm to about 600 µm, about 100 µm to about 500 µm, about 100 µm to about 400 µm, about 100 µm to about 300 µm, about 100 µm to about 200 µm, about 250 µm to about 1400 µm, about 250 µm to about 1200 µm, about 250 µm to about 1000 µm, about 250 µm to about 800 µm, about 250 µm to about 900 µm, about 250 µm to about 700 µm, about 250 µm to about 600 µm, about 250 µm to about 500 µm, about 500 µm to about 1400 µm, about 500 µm to about 1200 µm, about 500 µm to about 1000 µm, about 500 µm to about 800 µm, about 500 µm to about 900 µm, about 500 µm to about 700 µm, about 750 µm to about 1400 µm, about 750 µm to about 1200 µm, about 750 µm to about 1000 µm, about 100 µm to about 1400 µm, about 1000 µm to about 1200 µm, or about 1200 µm to about 1400 µm.

In some embodiments, the liquid film is formulated to prepare a porous liquid enzyme. The liquid film of the porous liquid enzyme comprises at least one enzyme or type of enzyme (e.g., 1, 2, 3, 4, 5 or more enzymes). When the porous liquid enzyme is placed in contact with a working fluid that contains a substrate for the enzyme of the liquid film, the enzyme catalyzes a biological reaction that converts the substrate of the working fluid. For example, the oxidation of nickel octaethylprophyrin can be accomplished by contacting a working fluid having nickel octaethylprophyrin therein with a porous liquid enzyme that has cytochrome c in the liquid film, which is immiscible in the working fluid. As demonstrated by the Examples below, the porous liquid enzyme of the present disclosure provides a cost effective enzyme immobilization technique that does not require complicated immobilization steps or toxic agents, and provides an extremely efficient system for enzymatic reactions despite the liquid film and working fluid not mixing.

In some embodiments, the fresh infused or encapsulated liquid is substantially free of the substance or substrate that undergoes a mass transfer from the fluid to the infused liquid. In some embodiments, the fresh infused or encapsulating liquid is capable of forming a stable porous liquid system or a porous liquid enzyme system—e.g., a system with a spreading number at greater than −0.5 (e.g., a spreading number of ≥ about −0.5, ≥ about 0, ≥ about 1.0, ≥ about 1.5, ≥ about 2.0, ≥ about 2.5, ≥ about 3.0, ≥ about 3.5, ≥ about 4.0, ≥ about 4.5, ≥ about 5.0, ≥ about 5.5, ≥ about 6.0, ≥ about 6.5, ≥ about 7.0, ≥ about 7.5, ≥ about 8.0, ≥ about 8.5, ≥ about 9.0, ≥ about 9.5, or ≥ about 10.0).

In some embodiments, the unstable infused or encapsulating liquid covering may have a concentration of the substance or substrate that undergoes a mass transfer that results in a spreading number that is less than or equal to −0.5. For example, the porous liquid system or porous liquid enzyme system having an unstable infused liquid coating may have a spreading number of no greater than about 1.5 (e.g., ≤ about 1.5, ≤ about 1.4, ≤ about 1.3, ≤ about 1.2, ≤ about 1.1, ≤ about 1, ≤ about 0.9, ≤ about 0.8, ≤ about 0.7, ≤ about 0.6, ≤ about 0.5, ≤ about 0.4, ≤ about 0.3, ≤ about 0.2, ≤ about 0.1, ≤ about 0, ≤ about −0.1, ≤ about −0.2, ≤ about −0.3, ≤ about −0.4, or ≤ about −0.5).

In some embodiments, the infused or encapsulating liquid becomes unstable (and thus may be exchanged or replenished, as described in herein) when the concentration of the substance or substrate is at least (or greater than) about 5, about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 41, about 42, about 43, about 44, about 45, about 46, about 47, about 48, about 49, about 50, about 51, about 52, about 53, about 54, about 55, about 56, about 57, about 58, about 59, about 60, about 61, about 62, about 63, about 64, about 65, about 66, about 67, about 68, about 69, about 70, about 72, about 72, about 73, about 74, about 75, about 76, about 77, about 78, about 79, about 80, about 81, about 82, about 83, about 84, about 85, about 86, about 87, about 88, about 89, about 90, about 91, about 92, about 93, about 94, about 95, about 96, about 97, about 98, or about 99 wt. %. For example, the infused liquid may become unstable when the concentration of the substance or substrate that undergoes a mass transfer) is about 5 wt. % to about 100 wt. %, about 5 wt. % to about 90 wt. %, about 5 wt. % to about 80 wt. %, about 5 wt. % to about 70 wt. %, about 5 wt. % to about 60 wt. %, about 5 wt. % to about 50 wt. %, about 5 wt. % to about 40 wt. %, about 5 wt. % to about 30 wt. %, about 5 wt. % to about 20 wt. %, about 10 wt. % to about 100 wt. %, about 10 wt. % to about 90 wt. %, about 10 wt. % to about 80 wt. %, about 10 wt. % to about 70 wt. %, about 10 wt. % to about 60 wt. %, about 10 wt. % to about 50 wt. %, about 10 wt. % to about 40 wt. %, about 10 wt. % to about 30 wt. %, about 10 wt. % to about 20 wt. %, about 15 wt. % to about 100 wt. %, about 15 wt. % to about 90 wt. %, about 15 wt. % to about 80 wt. %, about 15 wt. % to about 70 wt. %, about 15 wt. % to about 60 wt. %, about 15 wt. % to about 50 wt. %, about 15 wt. % to about 40 wt. %, about 15 wt. % to about 30 wt. %, about 20 wt. % to about 100 wt. %, about 20 wt. % to about 90 wt. %, about 20 wt. % to about 80 wt. %, about 20 wt. % to about 70 wt. %, about 20 wt. % to about 60 wt. %, about 20 wt. % to about 50 wt. %, about 20 wt. % to about 40 wt. %, about 20 wt. % to about 30 wt. %, about 25 wt. % to about 100 wt. %, about 25 wt. % to about 90 wt. %, about 25 wt. % to about 80 wt. %, about 25 wt. % to about 70 wt. %, bout 25 wt. % to about 60 wt. %, about 25 wt. % to about 50 wt. %, about 25 wt. % to about 40 wt. %, about 30 wt. % to about 100 wt. %, about 30 wt. % to about 90 wt. %, about 30 wt. % to about 80 wt. %, about 30 wt. % to about 70 wt. %, about 30 wt. % to about 60 wt. %, about 30 wt. % to about 50 wt. %, about 30 wt. % to about 40 wt. %, about 35 wt. % to about 100 wt. %, about 35 wt. % to about 90 wt. %, about 35 wt. % to about 80 wt. %, about 35 wt. % to about 70 wt. %, about 35 wt. % to about 60 wt. %, about 35 wt. % to about 50 wt. %, about 40 wt. % to about 100 wt. %, about 40 wt. % to about 90 wt. %, about 40 wt. % to about 80 wt. %, about 40 wt. % to about 70 wt. %, about 40 wt. % to about 60 wt. %, about 40 wt. % to about 50 wt. %, about 45 wt. % to about 100 wt. %, about 45 wt. % to about 90 wt. %, about 45 wt. % to about 80 wt. %, about 45 wt. % to about 70 wt. %, about 45 wt. % to about 60 wt. %, about 50 wt. % to about 100 wt. %, about 50 wt. % to about 90 wt. %, about 50 wt. % to about 80 wt. %, about 50 wt. % to about 70 wt. %, about 50 wt. % to about 60 wt. %, about 55 wt. % to about 100 wt. %, about 55 wt. % to about 90 wt. %, about 55 wt. % to about 80 wt. %, about 55 wt. % to about 70 wt. %, about 60 wt. % to about 100 wt. %, about 60 wt. % to about 90 wt. %, about 60 wt. % to about 80 wt. %, about 60 wt. % to about 70 wt. %, about 65 wt. % to about 100 wt. %, about 65 wt. % to about 90 wt. %, about 65 wt. % to about 80 wt. %, about 70 wt. % to about 100 wt. %, about 70 wt. % to about 90 wt. %, about 70 wt. % to about 80 wt. %, about 80 wt. % to about 100 wt. %, or about 90 wt. % to about 100 wt. %.

Method of Performing a Liquid-Based Extraction

A further aspect of the present disclosure provides a method of performing a liquid-based extraction. In some embodiments, the method comprises: providing a porous liquid comprising a high surface area solid and a liquid film substantially covering the high surface area solid (e.g., at least 30%, 40%, 50%, 60%, 70%, 80%, or 90% of the surface or surface area of the high surface area solid is covered by the infused or encapsulating liquid film and a PI greater than 150 m$^{-1}$) that is formulated to extract or absorb at least one species or substance from a fluid that is immiscible with the liquid film; and contacting the fluid and the liquid film to produce a liquid-fluid interface, wherein contacting the fluid over the porous liquid results in a mass transfer of the species or substance across the liquid-fluid interface.

In some embodiments, the method comprises: (1) contacting a porous liquid comprising a high surface area solid and a liquid film substantially covering the high surface area solid (e.g., at least 30%, 40%, 50%, 60%, 70%, 80%, or 90% of the surface or surface area of the high surface area solid is covered by an infused or encapsulating liquid film and a PI greater than 150 m$^{-1}$) and (2) a fluid that is immiscible with the liquid film such that a liquid-fluid interface is produced and includes at least one species or substance that is extracted or absorbed by the liquid film, wherein contacting the porous liquid and the fluid results in the mass transfer of the species or substance across the liquid-fluid interface.

The porous liquid utilized by the method of the present disclosure may be any porous liquid described herein.

In some embodiments, at least one of: (1) the fluid includes carbon dioxide (such as a flue gas, or a chemical or refinery gas); (2) the liquid film includes an amine (e.g., monoethanolamine, tetraethylenepentamine), potassium hydroxide, or both; or (3) a combination thereof. In particular embodiments, at least one of: (1) the fluid includes water (such as wet natural gas); (2) the liquid film includes glycol (e.g., triethylene glycol); or (3) combinations thereof. In other embodiments, the fluid is a liquid.

Method of Performing an Enzymatic Reaction

A further aspect of the present disclosure provides a method of performing an enzymatic reaction. In some embodiments, the method comprises: providing a porous liquid enzyme comprising a high surface area solid and a liquid film substantially covering the higher surface area solid (e.g., at least 30, 40, 50, 60, 70, 80, or 90% of the surface or surface area of the high surface area solid is covered by the infused or encapsulating liquid film and a PI greater than 150 m$^{-1}$) and comprising an enzyme; and contacting a fluid that is immiscible with the liquid film such that a liquid-fluid interface is produced and includes at least one substrate for the enzyme of the liquid film, wherein contacting the fluid and the porous liquid enzyme results in at least one of the catalysis of the substrate, a mass transfer of the substrate across the liquid-fluid interface, or both.

In some embodiments, the method comprises contacting (1) a porous liquid enzyme comprising a high surface area solid and a liquid film substantially covering the higher surface area solid (e.g., at least 30% of the surface or surface area of the high surface area solid is covered) that includes an enzyme, and (2) a fluid that is immiscible with the liquid film such that a liquid-fluid interface is produced and includes at least one substrate for the enzyme of the liquid film, wherein contacting the fluid and the porous liquid enzyme results in at least one of the catalysis of the substrate, a mass transfer of the substrate across the liquid-fluid interface, or both.

The porous liquid utilized by this method may be any porous liquid described herein.

In some embodiments, the liquid film has a contact angle on the high surface area solid materials in the presence of the working fluid that is less than about 15 degrees. For example, in certain embodiments, the contact angle of the liquid film on the high surface area solid in the presence of the fluid is less than about 14 degrees, less than about 13 degrees, less than about 12 degrees, less than about 11 degrees, less than about 10 degrees, less than about 9 degrees, less than about 8 degrees, less than about 7 degrees, less than about 6 degrees, less than about 5 degrees, less than about 4 degrees, less than about 3 degrees, less than about 2 degrees, less than about 1 degree, or about 0 degrees or 0 degrees.

In some embodiments, the liquid film is an aqueous solution and the working fluid is an organic solution.

In some embodiments, the enzyme is cytochrome c, the substrate is nickel octaethylporphyrin, and the high surface area solid is wool (e.g., glass wool and/or quartz wool).

Method of Recoating a Porous Liquid or a Porous Liquid Enzyme

The present disclosure provides a method of recoating a porous liquid or porous liquid enzyme. The method comprises: contacting a porous liquid system or porous liquid enzyme system having an unstable infused or encapsulating liquid coating with fresh infused or encapsulating liquid, wherein contacting the porous liquid system or porous liquid enzyme system with the fresh infused or encapsulating liquid results in a porous liquid or porous liquid enzyme with a stable coating of infused or encapsulating liquid.

The porous liquid utilized in this method may be any porous liquid described herein.

Method of Selecting a High Surface Area Solid of a Porous Liquid System or a Porous Liquid Enzyme System Another aspect of the present disclosure provides a method of selecting a high surface area solid of a porous liquid system or a porous liquid enzyme system. The method comprises: selecting at least one of an infused or encapsulating liquid, a fluid that is immiscible with the infused liquid, or both; and selecting a high surface area solid that results in a porous liquid system or a porous liquid enzyme with a spreading number (Sn) of at least −0.5, wherein:

$$S_n = (\gamma_{SW} - \gamma_{OS} - \gamma_{OW})\gamma_{OW};$$

$\gamma_{SW}$ is the interfacial tension between a high surface area solid phase and a fluid phase;

$\gamma_{OS}$ is the interfacial tension between an infused liquid phase and the high surface area solid phase; and $\gamma_{OW}$ is the interfacial tension between the infused liquid phase and the fluid phase, wherein the infused liquid substantially covering the high surface area solid (e.g., at least 30% of the surface or surface area of the high surface area solid is coated or infused by the infused liquid), and the immiscible fluid form a liquid-fluid interface.

The present method allows for the selection of the components of a porous liquid system or porous liquid enzyme system with minimal experimentation. In general, the infused liquid and working fluid are governed by the intended use of the porous liquid or porous liquid enzyme system. One would select the appropriate infused liquid and working fluid for the intended use based on knowing or determining respective surface tensions and then one can select an appropriate high surface area solid to form a stable porous liquid or porous liquid enzyme system. Any method of determining the polar and dispersive components of surface tension for the infused liquid, working fluid, and/or high surface area solid are contemplated. In fact, many polar and dispersive components of surface tensions are known and thus, are readily available without experimentation. For example, the Standard Test Method for Measurement of the Surface Tension of Solid Coatings, Substrates and Pigments using Contact Angle Measurements (ASTM D7490-13) may be utilized.

Method of Preparing a Porous Liquid System or a Porous Liquid Enzyme System

An additional aspect of the present disclosure provides a method of preparing a porous liquid system or a porous liquid enzyme system. The method comprises: selecting at least one of an infused or encapsulating liquid, a fluid that is immiscible in the impregnating liquid, or both; selecting a high surface area solid that results in a porous liquid system or a porous liquid enzyme with a spreading number Sn of at least −0.5; and contacting the high surface area solid with the infused liquid, wherein:

$$S_n = \frac{\gamma_{SW} - \gamma_{OS} - \gamma_{OW}}{\gamma_{OW}};$$

$\gamma_{SW}$ is the interfacial tension between a high surface area solid phase and a fluid phase;
$\gamma_{OS}$ is the interfacial tension between an infused liquid phase and the high surface area solid phase; and
$\gamma_{OW}$ is the interfacial tension between the infused liquid phase and the fluid phase, wherein the infused liquid substantially covering the high surface area solid (e.g., at least 30% of the surface or surface area of the high surface area solid is coated or infused by the infused liquid), and the immiscible fluid forms a liquid-fluid interface with the infused liquid.

EXAMPLES

Example 1

Quartz Wool

Quartz wool surface structure was examined using Scanning Electron Microscopy (SEM). FIGS. 2A and 2B show a typical micrograph of quartz wool fibers. The natural roughness of the quartz wool fiber and the surface chemistry keep the desirable liquid on the surface.

Example 2

Porous Liquid Oil Using 3D Printed Structure

FIG. 6A shows an exemplary 3D printed structure of a high surface area solid surface. It consist of 69 filaments with surface-to-surface distance of 500 microns mounted on a perforated disc having a diameter of 12 mm, producing S/V=1487 m$^{-1}$. In this example, the diameter and length of each filament is about 800 microns and 25 mm, respectively. The structure was printed using additive manufacturing laser metal deposition of aluminum oxide. The 3D printed structure was cleaned with acetone, then ethanol, and then heptane before being dried using nitrogen gas. The solvent cleaned 3D structure was then left in a plasma cleaner for 5 minutes. Plasma radiation oxidizes the surface to substantially increase the surface energy of the 3D structure. This surface chemical modification allows liquid to cover a larger area of the surface. After plasma cleaning, the 3D structure was introduced to 200 mg of poly-alpha-olefin 2 cSt (PAO2) oil. FIG. 6B is an optical micrograph of liquid oil (PAO2) within the roughness of the structure. FIG. 6B demonstrates the porous liquid is indeed holding liquid within the roughness of its surface.

FIG. 6C shows an exemplary 3D printed structure of a high surface area solid. It consist of filaments of 800 microns diameter mounted with surface-to-surface distance of 500 microns in a tube of 1.1 cm inner diameter with approximate length of 8 cm, producing S/V=1487 m$^{-1}$. The structure and the tube surrounding the structure were printed using additive manufacturing with laser metal deposition of aluminum oxide.

Example 3

Flowing Nature of Liquid in Porous Liquid Oil Using 3D Printed Structure

Figure 7:
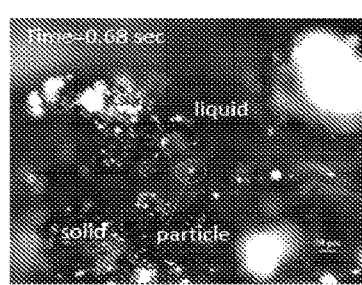
FIG. 7.
Figure 7:
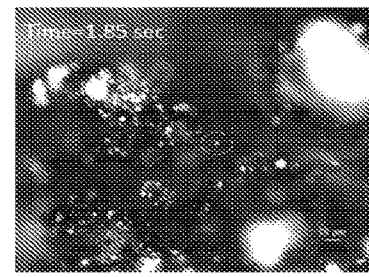
Figure 7:
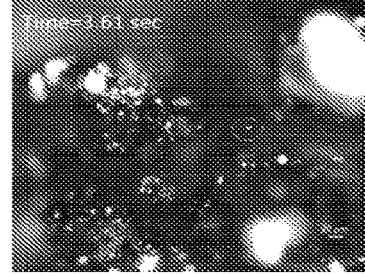
Figure 7:
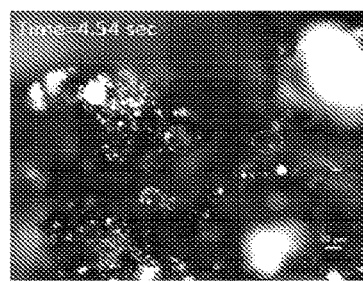
Figure 7:
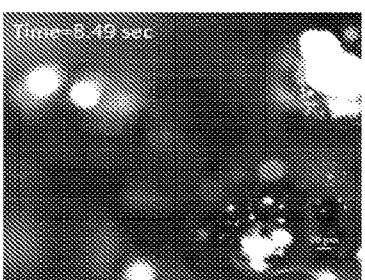

Example 3 demonstrates the liquid nature of the porous liquid oil. The 3D printed structure noted in Example 2 was plasma cleaned as described previously. The structure was then introduced to 200 mg of PAO2 oil which contained 5-10 micron hydrophobic solid particles. The solid particles were used to visualize the fluid nature of the liquid infused within the 3D printed structure. The flow of a solid particle was followed using a video camera mounted on the microscope. FIG. 7 shows the time lapse images of the movement of the solid particle in an infused liquid PAO2 oil within the roughness of the porous liquid oil. This example demonstrates that liquid covering the surface in a porous liquid is indeed liquid in nature and can be readily available to interact with a working fluid for separation and reaction.

Example 4

Removing CO$_2$ Using Porous Liquid Amine (Quartz Wool)

Figure 8A:
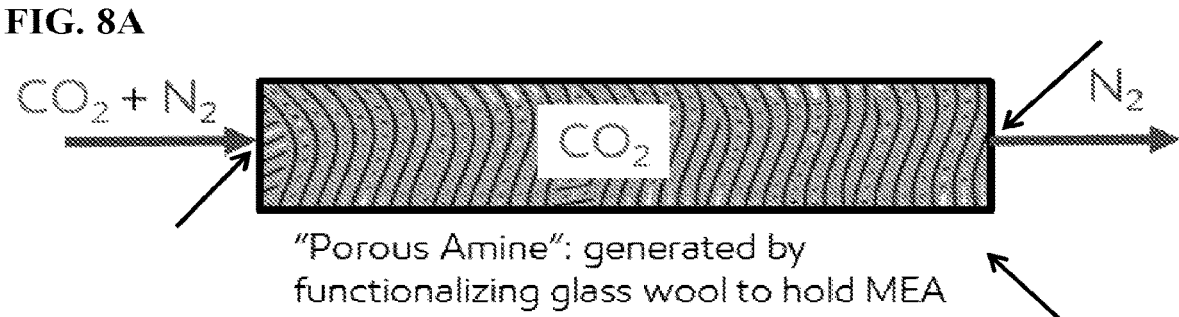
FIGS. 8A, 8B, 8C, 8D, 8E, and 8F.

A small amount of quartz wool was placed in a plasma cleaner for 5 minutes. The plasma treatment increased the surface energy of the quartz wool fibers. The high surface energy and natural roughness of the fibers allowed the fibers to be fully wetted by the liquid amine and hold the liquid on its surfaces. Liquid water-free monoethanolamine (MEA) was distributed on the surfaces of the quartz wool to produce a porous liquid MEA (or porous liquid amine; as shown schematically in FIG. 1), with S/V=548 m$^{-1}$ and PI=170.0 m$^{-1}$. Said porous liquid MEA was then mounted in an experimental tube where a 50:50 mixture of CO$_2$ and N$_2$ passed through the porous liquid MEA by sending the gas mixture into the entrance port of the tube (see FIG. 8A). The outlet port of the tube was connected to a mass spectrometer (MS) for gas analysis. The experimental tube was kept in an oven at a temperature of 30° C.

Figure 8B:
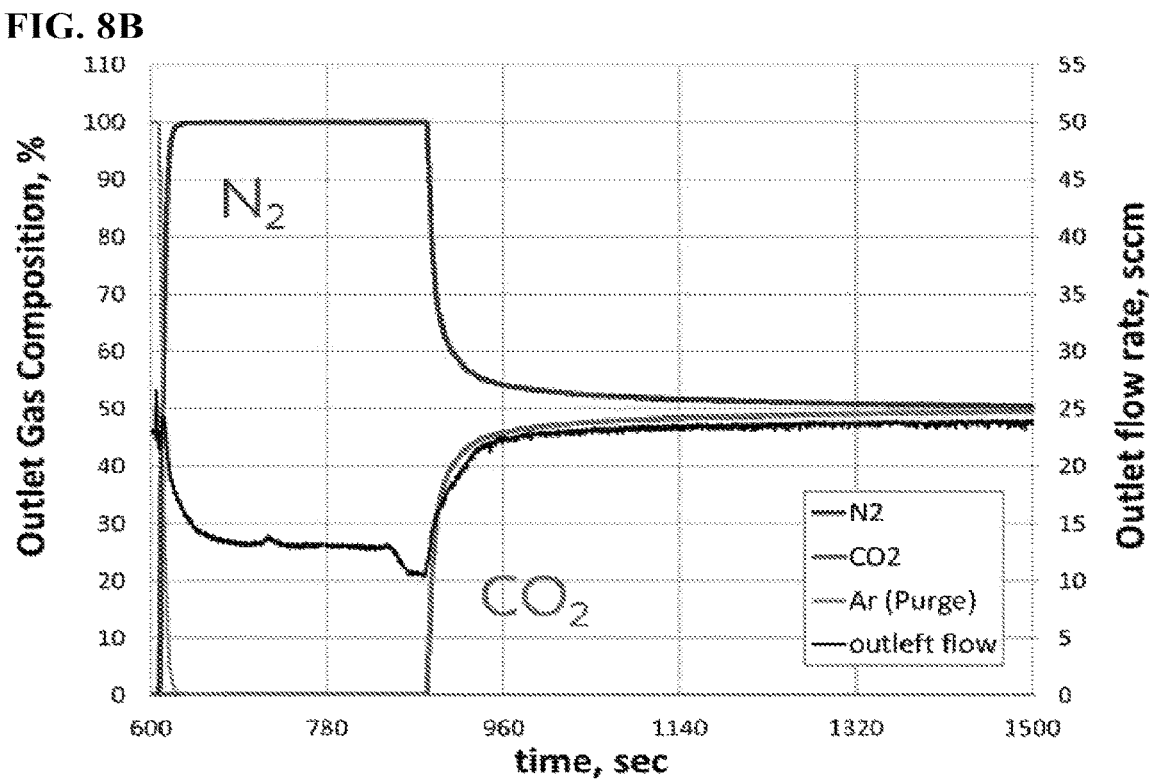
Figure 8C:
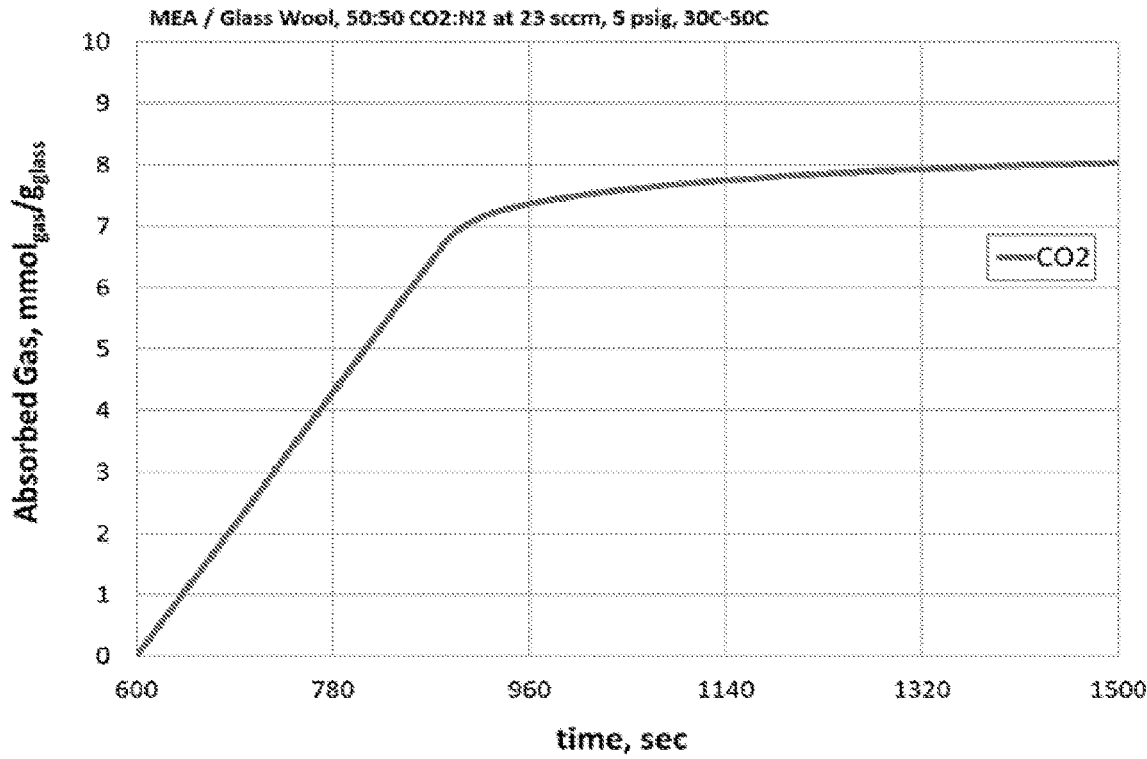

FIG. 8B shows the outlet gas composition and outlet gas flow, and FIG. 8C shows the evolution of CO$_2$ absorption in mmole CO$_2$ per gram of MEA-functionalized quartz wool, obtained from MS analysis. When the gas mixture of CO$_2$ and N$_2$ was passed through the porous liquid amine, all gas CO$_2$ was captured during the first 300 seconds of the experiment, thereby producing pure N$_2$ gas. Calculations of CO$_2$ absorption on amine basis show that, as CO$_2$ absorption reaches the equilibrium, every 2 molecules of MEA captured one molecule of CO$_2$, which is the maximum theoretical value that can be achieved without water present in the amine film. The effective adsorption of CO$_2$ by the porous liquid MEA was due to the high surface area of the liquid amine present in a thin layer on the fibers of quartz wool, which allows the carbon dioxide to react with all of the available amine.

Figure 8D:
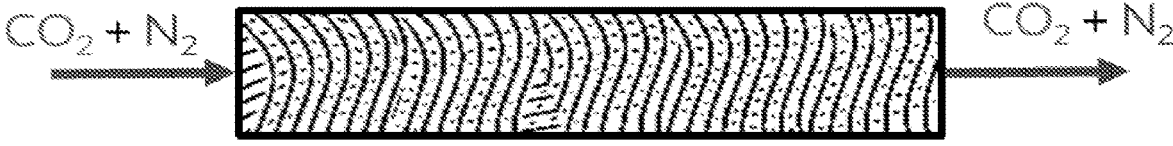
Figure 8E:
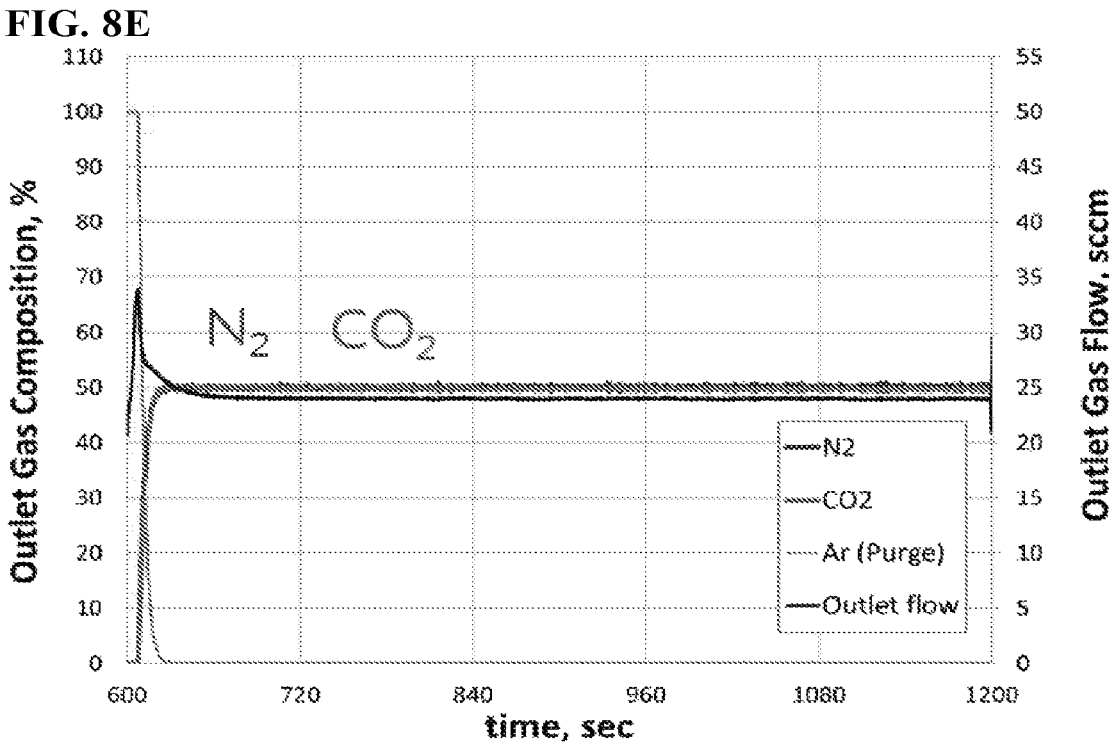
Figure 8F:
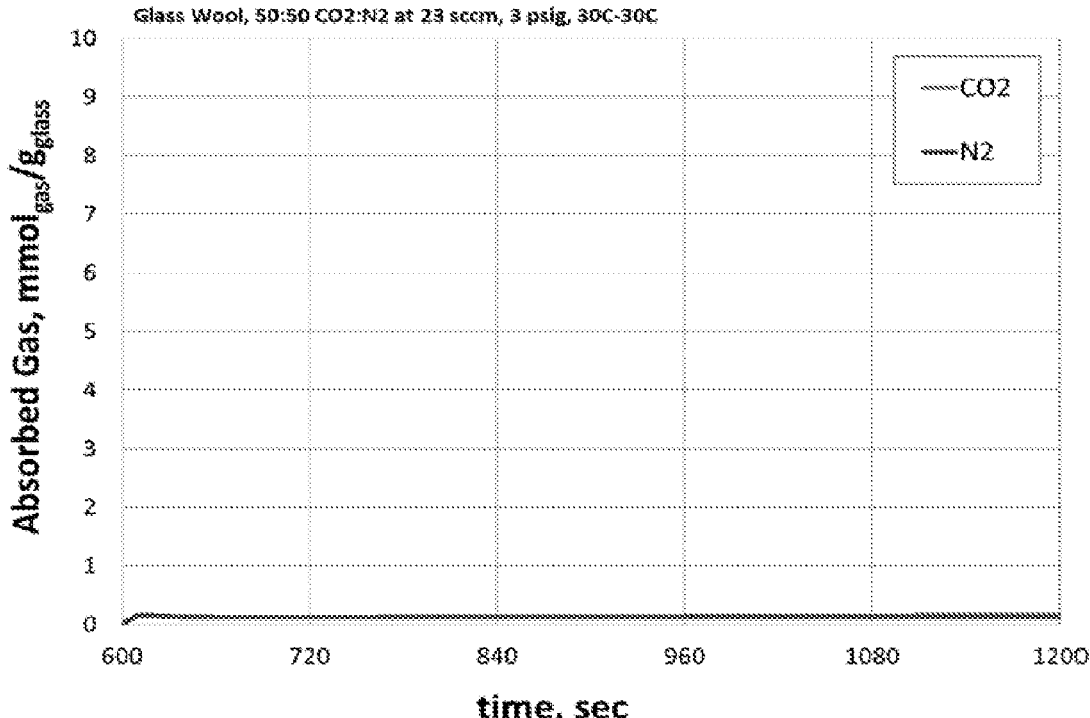

FIG. 8D shows the comparative example when $CO_2/N_2$ gas mixture was sent through an experimental tube with non-functionalized quartz wool. As shown by the outlet gas composition (FIG. 8E), both $CO_2$ and $N_2$ immediately break through the experimental tube and reach the inlet concentration of 50:50, thereby confirming that quartz wool itself is inert to both gases and does not adsorb $CO_2$. A small amount of $N_2$ and $CO_2$ (~0.1 mmol/g) was retained in the inter-wool porosity of the tube (FIG. 8F).

Example 5

Figure 9A:
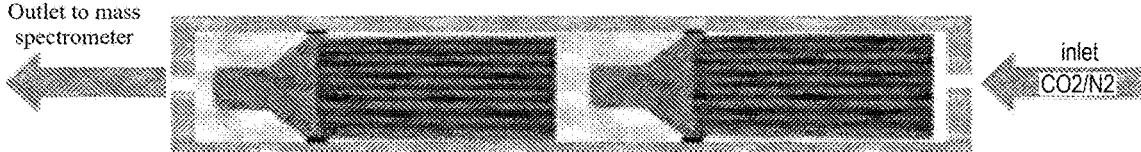
FIGS. 9A, 9B, 9C, 9D, 9E, and 9F.

Removing $CO_2$ Using Porous Liquid Amine Using 3D Printed Structure with PI Greater than 150.0 $m^{-1}$ Two 3D printed structures as described in Example 2 were cleaned with solvent and then with plasma as described in Example 3. A total of 619 mg of TEPA was introduced to the two 3D printed structures, producing PI=157.1 $m^{-1}$. The plasma treatment increased the surface energy of the 3D structures. The high surface energy and the roughness allowed the 3D structures to be fully wetted by the liquid amine and hold the liquid on its surfaces, similar to what is shown in FIGS. 6B and 7. The two porous liquid TEPAs were then mounted in an experimental tube where a 50:50 mixture of $CO_2$ and $N_2$ passed through the porous liquid TEPAs by sending the gas mixture into the entrance port of the tube, as shown in FIG. 9A. The temperature of the experimental tube was kept at 130° C. using a block heater during the gas flow. The outlet port of the tube was connected to a mass spectrometer (MS) for gas analysis.

Figure 9B:
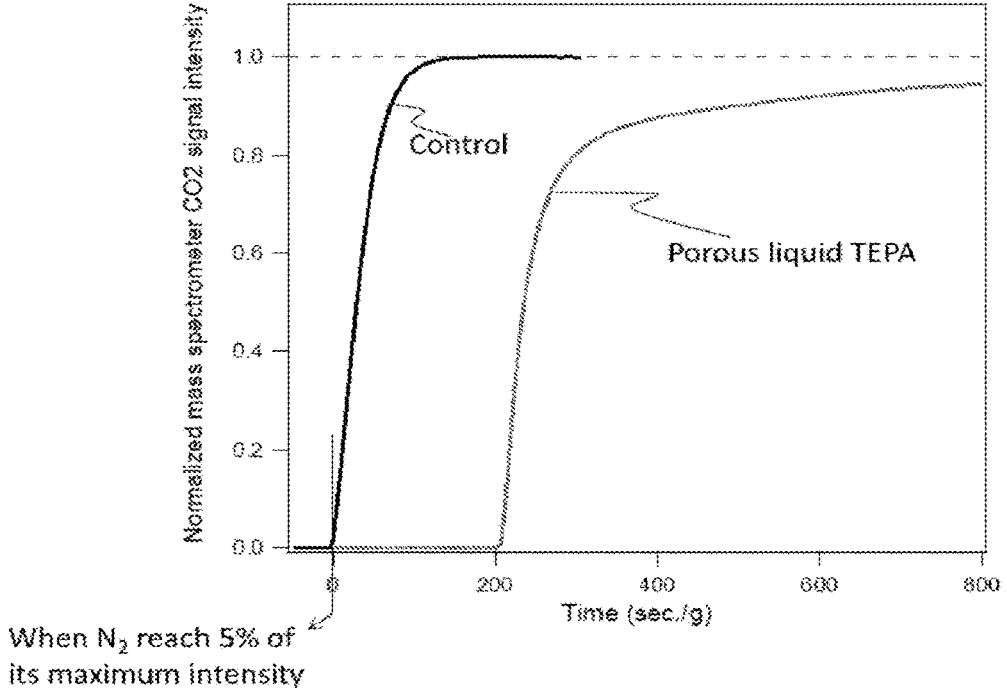

FIG. 9B shows the variation of the normalized (divided by its maximum intensity) mass spectroscopy signal of CO2 with time, also normalized to the weight of the amine. Time zero is set when N2 gas is detected at 5% of its maximum intensity. The weight-normalized breakthrough time, tbw, is defined when CO2 was detected at 5% of its maximum intensity. FIG. 9B shows that for a significant amount of time (tbw=210 seconds/g) no CO2 was able to escape the porous liquid TEPAs. The tbw of 210 seconds/g is equivalent to the volume normalized breakthrough time, tbv=22 seconds/cc. The time axis in FIG. 9B represents the time per gram of amine when TEPA was used. The ability of amine to capture CO2 at 130° C. is very surprising. Normally temperatures above 100° C. have been used to desorb CO2 from amine. However, the ability of the porous liquid TEPA at 130° C. may be due to the liquid property of the infused amine in the porous liquid TEPA. At the elevated temperature, although the chemical reaction between CO2 and amine is weak, the viscosity of the amine is also low. Low viscosity provides a greater diffusion length of CO2 in the infused amine liquid and thus makes more amine available to react with CO2 for removal. This behavior is solely due to the ability of the preserving liquid within the porosity of the surface in the porous liquid TEPA. FIG. 9B also shows the results of an experiment when the said 3D printed structure were prepared as before but this time no amine was introduced to the structure (control). Results indicate that when no amine is infused within the roughness of the 3D printed structure the amount of CO2 removed by the structure is undetectable.

Figure 9C:
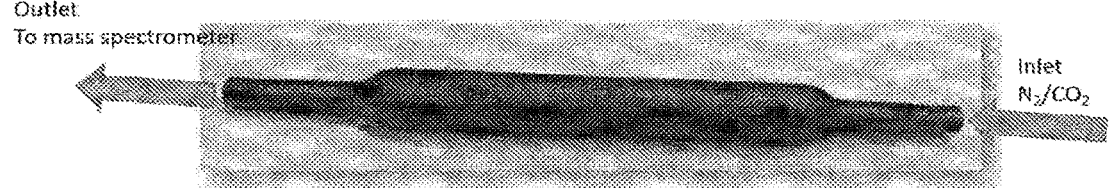

The 3D printed structure as described in Example 2 and shown in FIG. 6C was cleaned with solvent and then left in air oven for 3 hours at 400° C. A total of 780 mg of TEPA was introduced to the structures, with PI=168.5 $m^{-1}$. The 400° C. air oven treatment increased the surface energy of the 3D structures. The high surface energy and the roughness allowed the 3D structures to be fully wetted by the liquid amine and hold the liquid on its surfaces. The structures were then mounted in an experimental setup where a 50:50 mixture of $CO_2$ and $N_2$ passed through the porous liquid TEPA by sending the gas mixture into one end of the tube as shown in FIG. 9C. The temperature of the experimental tube was kept at 130° C. using a block heater during the gas flow. The outlet port of the tube was connected to a mass spectrometer (MS) for gas analysis.

Figure 9D:
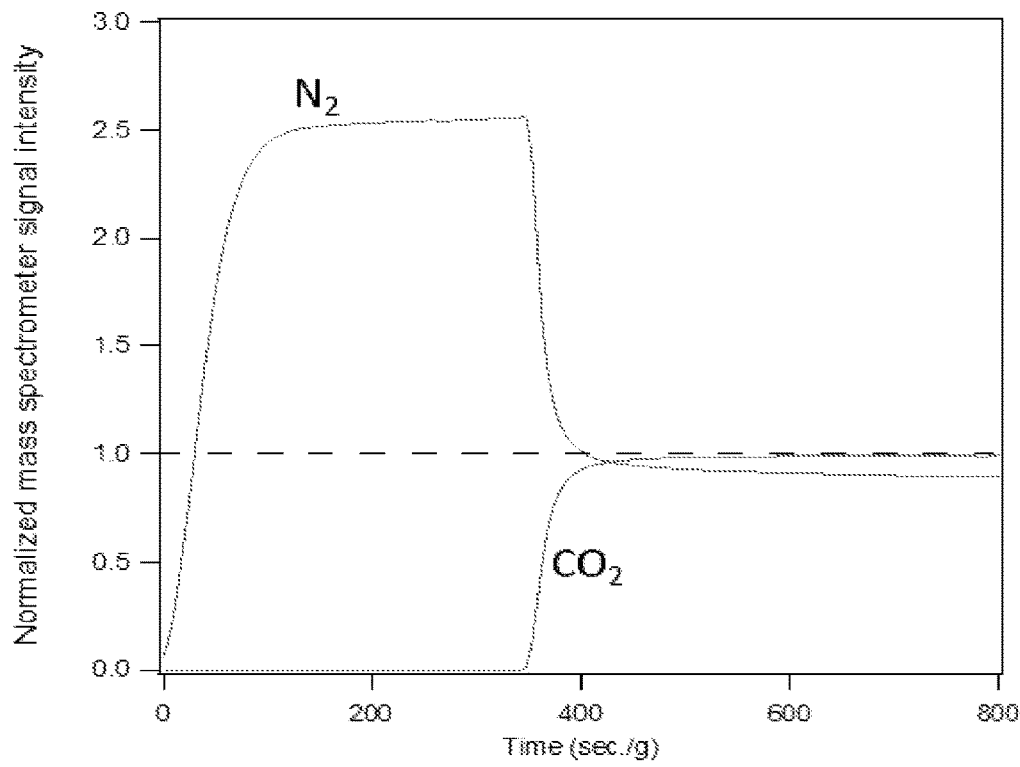

FIG. 9D shows the variation of the normalized (divided by its maximum intensity) mass spectroscopy signal of CO2 with time. Time zero is set when N2 gas is detected at 5% of its maximum intensity. The breakthrough time normalized to the weight of the amine, tbw, is defined when CO2 was detected at 5% of its maximum intensity. FIG. 9D shows that for a significant amount of time (tbw=348 seconds/g) no CO2 was able to escape the porous liquid TEPA. The time axis in FIG. 9D represents the time per gram of amine when TEPA was used. The tbw of 348 seconds/g is equivalent to the volume normalized breakthrough time, tbv of 39 seconds/cc. The ability of amine to capture CO2 at 130° C. is very surprising. Normally temperatures above 100° C. have been used to desorb CO2 from amine. However, the ability of the porous liquid TEPA at 130° C. may be due to the liquid property of the infused amine in the porous liquid TEPA.

Example 6

Removing $CO_2$ Using Porous Liquid Amine Using Ceramic Monolith with PI Smaller than 150.0 $m^{-1}$ An effective porous liquid possesses an appropriate surface chemistry that is able to be wetted by the liquid and an appropriate surface texture or roughness to have a PI greater than 150 $m^{-1}$. In this example, two ceramic monoliths with high S/V of 2300 $m^{-1}$ were used without any surface modification.

Figure 9E:
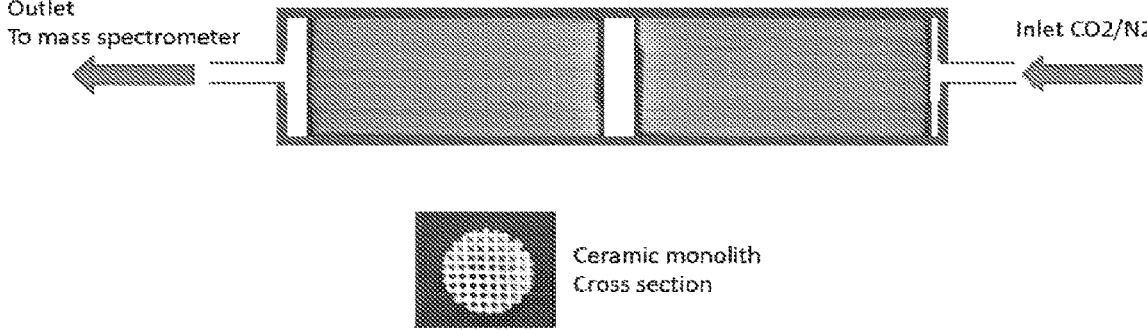

Introducing TEPA to the two ceramic monoliths produced a total of 311 mg (0.313 cc) of the amine infused on the surface of the monoliths, with PI=135.1 $m^{-1}$. The monoliths were then mounted in an experimental tube where a 50:50 mixture of $CO_2$ and $N_2$ passed through the porous liquid TEPAs through the entrance ports, as shown in FIG. 9E. The temperature of the experimental tube was kept at 130° C. using a block heater during the gas flow. The outlet port of the tube was connected to a mass spectrometer (MS) for gas analysis.

Figure 9F:
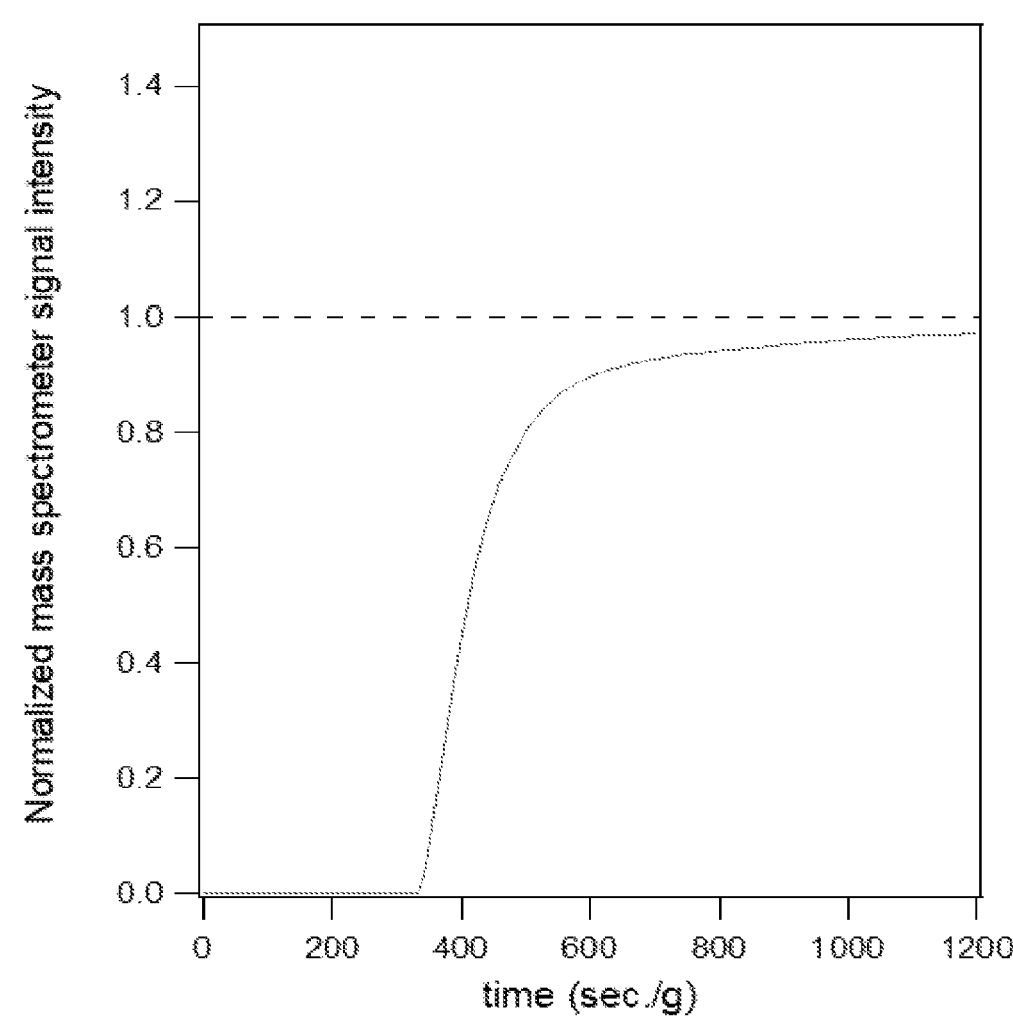

FIG. 9F shows the variation of the normalized (divided by its maximum intensity) mass spectroscopy signal of CO2 with time. Time zero is set when N2 gas is detected at 5% of its maximum intensity. The weight breakthrough is time normalized to the weight of the amine, tbw, is defined when CO2 was detected at 5% of its maximum intensity. FIG. 9F shows that for a significant amount of time (tbw=321 seconds/g), no CO2 was able to escape this porous liquid TEPA. The tbw of 321 seconds/g is equivalent to the volume normalized breakthrough time, tbv=19 seconds/cc. Although the tbw is comparable with the porous liquid TEPA impregnated structures described in Example 5, the tbv is significantly lower than that of the 3D printed examples. A low PI value of 135.1 $m^{-1}$ represents a low value of VI/V of only 0.059. This in turn, forces higher volume of reactor to be used for CO2 capture. A PI of greater than 150.0 $m^{-1}$, such as in Example 5, with Vl/V porous liquid TEPA of 0.1, reduces the reactor volume by two times.

Example 7

Removing Water Using Porous Liquid Triethylene Glycol

A small amount of quartz wool was placed in a plasma cleaner for 5 minutes. The plasma treatment increases the surface energy of the quartz wool fibers. The high surface energy and natural roughness of the fibers allowed the fibers to be fully wetted by the liquid amine and hold liquid on its surfaces. Liquid triethylene glycol (TEG) was distributed on the surfaces of quartz wool to produce a porous liquid TEG (as shown schematically in FIG. 1). The said porous liquid TEG was then mounted in an experimental tube where wet hydrocarbon gas passed over the porous liquid TEG by sending the wet hydrocarbon through the entrance port of the tube (see FIG. 10). The exit port of the tube was connected to FTIR (Fourier transform infrared spectroscopy) for gas analysis. The wet hydrocarbon gas was produced by bubbling $N_2$ gas into water in the presence of heptane.

Figure 10:
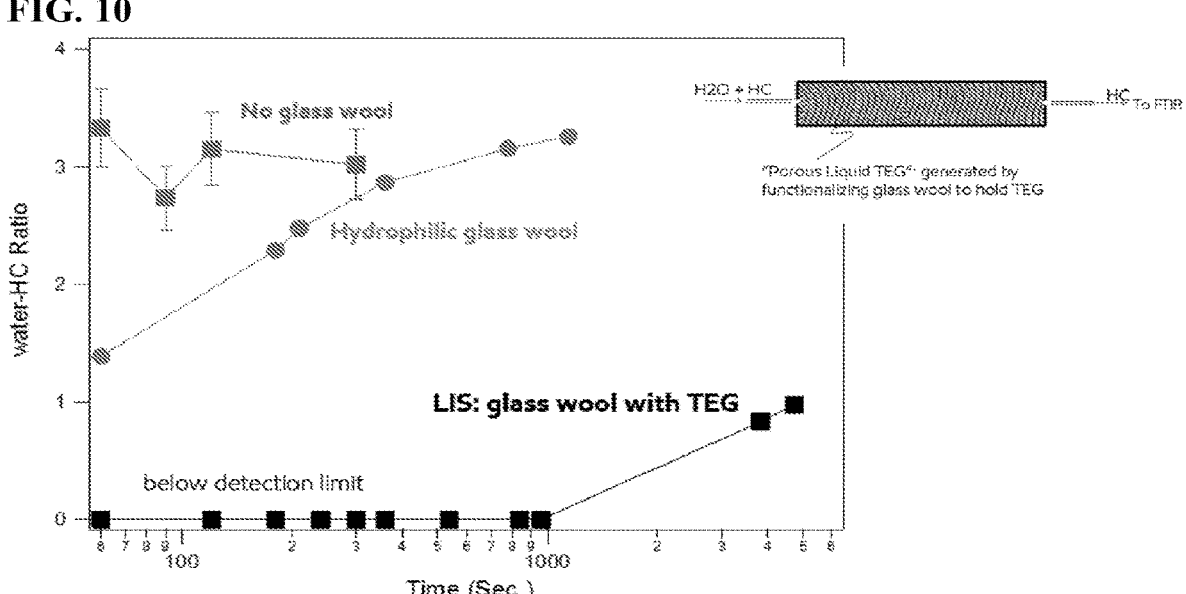
FIG. 10. Water/hydrocarbon concentration ratio of gas exiting an experimental tube that includes a glycol containing porous liquid or quartz wool without a liquid film (control), or that is empty.

FIG. 10 shows the variation of water/hydrocarbon concentration ratio of gas exiting the experimental tube, as determined by FTIR analysis. FIG. 10 demonstrates that when no porous liquid TEG or quartz wool is present in the experimental tube (squares; hereinafter, the "Reference"), a significant amount of water passes through the sampling tube. When a plasma treated quartz wool was used in the experimental tube (circles; labeled as "hydrophilic glass wool") the amount of water was reduced with respect to the Reference. However, this effect is short lived. When porous liquid TEG was used in the experimental tube (squares; labeled as "LIS: glass wool with TEG") the concentration of water reduces to below the limit of detection of the FTIR (indicated by zero in the graph). This effect lasts much longer than when the plasma treated quartz wool with no TEG was utilized. Thus, the effective removal of water with porous liquid TEG is due to the high surface area of the liquid TEG that is present in a thin layer on the porous liquid TEG.

Example 8

Removal of Furfural from Aqueous Solution

Liquid toluene was distributed on the surfaces of polyethylene (PE) wool to produce porous liquid toluene (as shown schematically in FIG. 1). In this example, polyethylene wool was used to ensure wettability of toluene on the PE fibers in the presence of water. Porous liquid toluene was then immersed in a 5 g/L aqueous solution of furfural. After moving the porous liquid toluene around in the aqueous furfural solution, the remaining aqueous furfural solution was taken for UV-Vis analysis.

Figure 11A:
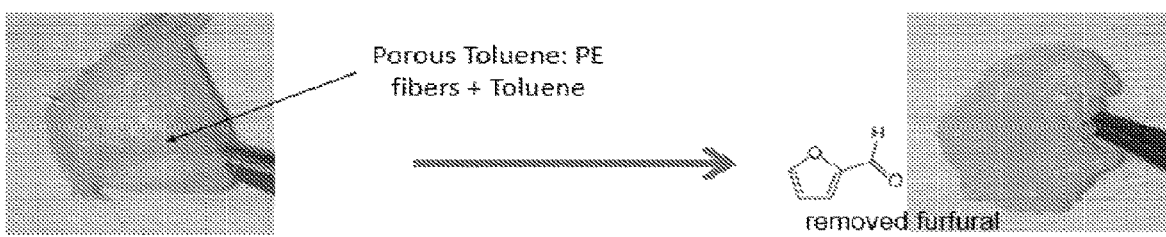
FIGS. 11A and 11B.
Figure 11B:
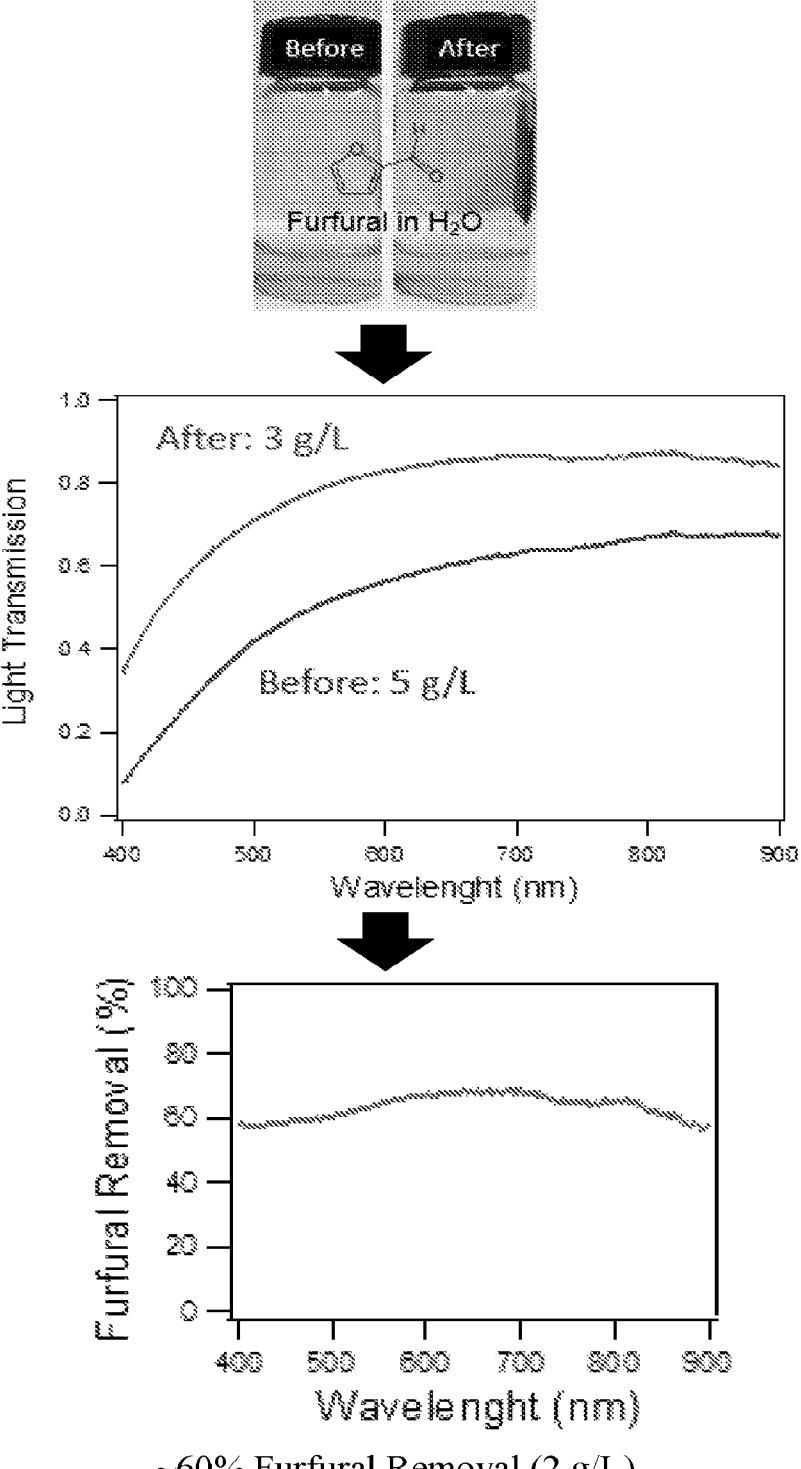

FIG. 11A shows the porous liquid toluene before and after immersion in the furfural solution. The yellow-brown color of the porous liquid toluene observed after coming into contact with the furfural solution is due to absorption of the furfural by the porous liquid toluene. FIG. 11B shows UV-Vis analysis of the before and after furfural solution. A significant amount of furfural was removed from the solution. In fact, as demonstrated by the US-Vis analysis, the porous liquid toluene removed approximately 60% of the furfural from the solution.

Example 9

Immobilization of Enzyme Using Porous Liquid Water

A small amount of quartz wool was treated with plasma for 5 minutes and then immediately immersed in the aqueous buffer with 2 µM of cytochrome c. After thorough distribution of the liquid on the quartz wool, excess enzyme solution was squeezed out from the quartz wool to produce a porous aqueous enzyme (PAE). The PAE was used for the oxidation of nickel octaethylporphyrin (NiOEP). The enzymatic reaction was accomplished by placing the PEA in contact with a mixture that contained the following: 10% (v/v) phosphate-buffered saline (1×), 90% (v/v) toluene with dissolved ~16.7 µM NiOEP, 100 mM tert-butyl hydroperoxide. The reactions were incubated at room temperature for 24 hours on a rocker and rotated at 25 rpm/min.

Figure 12:
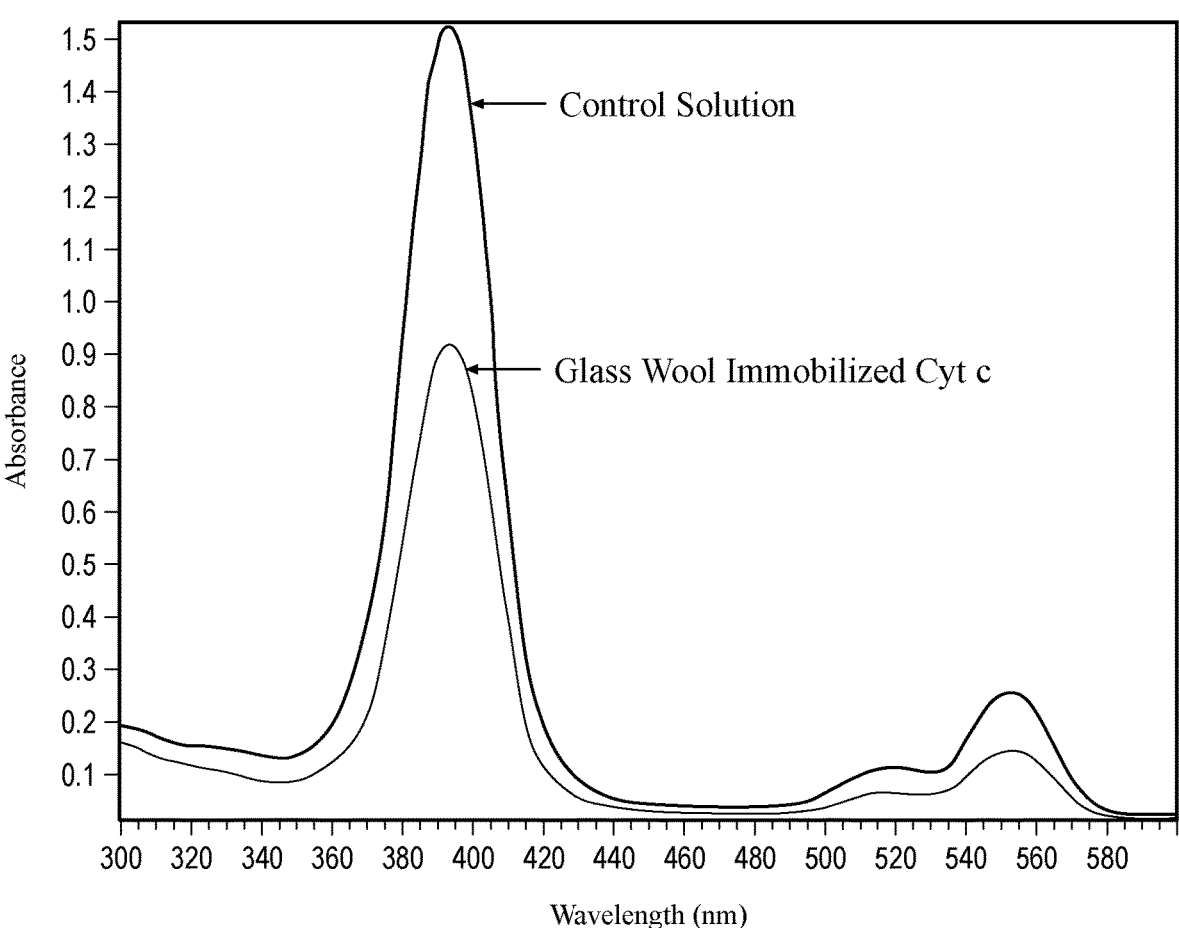
FIG. 12.

FIG. 12 shows the UV-vis analysis of the reacted solution after the 24 hour incubation. The height of the characteristic Soret band at ~393 nm for NiOEP treated with PAE was reduced as compared to the control solution without enzyme. Analysis indicates that about 41.3% of NiOEP was oxidized by the incubation with the PAE. Due to the limitation in mass transfer of hydrophobic NiOEP from organic solvent to aqueous phase, the free cytochrome c has limited access to NiOEP and does not show activity for oxidation. This example demonstrates that a significant increase in oxidative activity occurs when an enzyme is immobilized on PAE.

Thus, the articles of the present disclosure allow for the immobilization of a thin layer of enzyme solution on the surface of the carrier without using time-consuming, complicated or expensive enzyme immobilization methods. When the enzymatic reaction is carried out in a neat organic phase, the retained thin layer of aqueous phase not only increases the surface area of the interface between enzyme solution and the organic phase which contains substrates for enhanced enzymatic activities, but also provides optimal conditions for regeneration of water soluble cofactors for the enzymes. Similarly, one could retain a thin layer of the enzyme in an organic phase, while the enzymatic reaction is carried out in a neat aqueous phase.

Example 10

Figure 13:
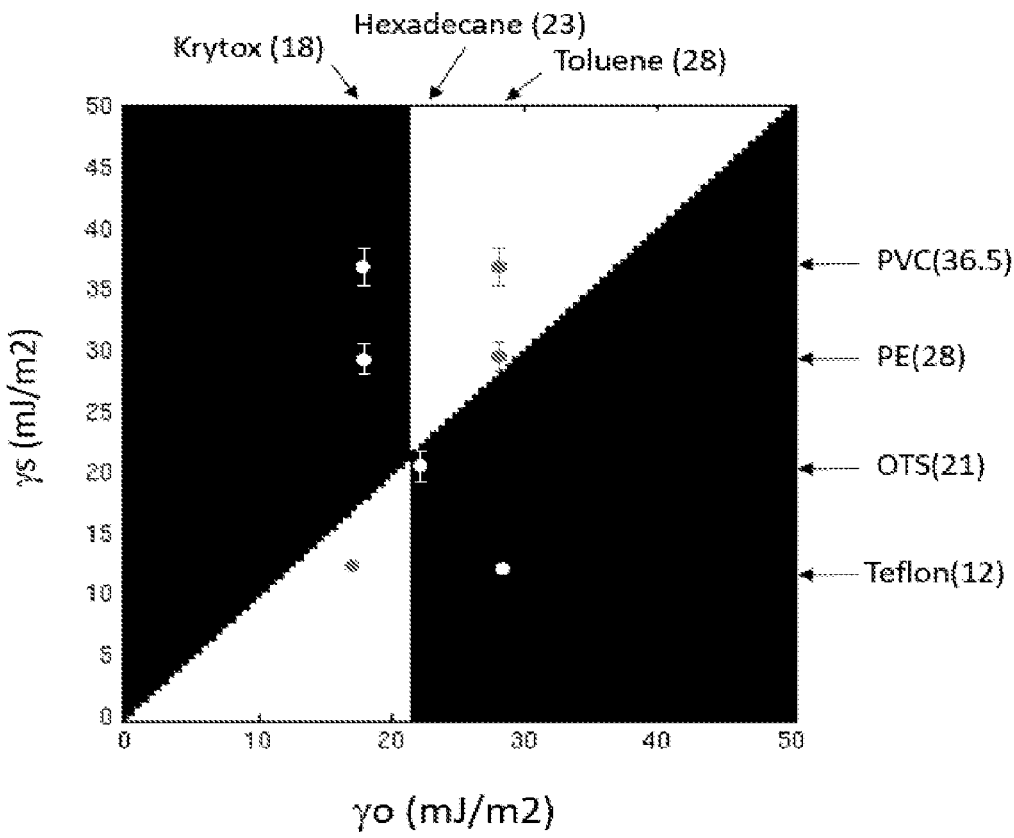
FIG. 13.

Selecting a High Surface Area Solid for an Encapsulating Liquid and Working Fluid The effect of surface tension of porous liquids infused with several different types of encapsulating liquids and working fluids was examined. FIG. 13 is a graph showing relationship between the surface tension of the high surface area solid and encapsulating liquid. In particular, the white regions of the graph illustrate the surface tensions of porous liquids that have encapsulating liquid stably covering the high surface area solid, while the black regions illustrate the surface tensions of porous liquids that do not have an encapsulating liquid stably covering the high surface area solid. This relationship can be explained by examining the spreading number, Sn, of the particular combination of high surface area solid, encapsulating liquid, and working fluid. That is, when the spreading number is greater than 0 (as depicted by the white regions in FIG. 13), the infused liquid provides a stable covering of the high surface area solid for the given working fluid. This is experimentally demonstrated by the data points on the graph, which are for the following high surface area solid and infused liquid combinations (1) toluene/polyvinyl chloride, (2) toluene/PE, and (3) Krytox/Teflon™. The surface tension of infused liquid and solid to generate data points are: Krytox 18 mJ/m2, Hexadecane 23 mJ/m2, Toluene 23 mJ/m2, polyvinyl chloride 41 mJ/m2, PE 34 mJ/m2, Teflon 20 mJ/m2 and OTS coated metal 23 mJ/2. The surface of all the solids are generally flat with a roughness within 5 μm.

Figure 4B:
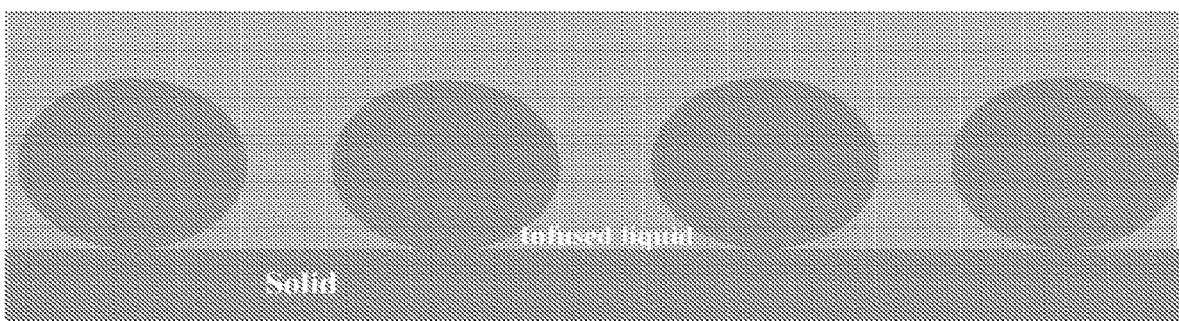

As a result of the above relationship, the Sn may be used to determine an appropriate high surface area solid for a particular infused liquid-working fluid combination. FIG. 4 illustrates the contact angle (θ) between the infused liquid (O) and the solid (S) in the present of a working fluid (W), and the associated interfacial tensions between the encapsulated liquid, the high surface area solid, and the working fluid. The Sn may be determined by the following equation:

$$S_n = \frac{\gamma_{SW} - \gamma_{OS} - \gamma_{OW}}{\gamma_{OW}},$$

wherein:

$\gamma_{SW}$ is the interfacial tension between a high surface area solid phase and a fluid phase;

$\gamma_{OS}$ is the interfacial tension between an infused liquid phase and the high surface area solid phase; and $\gamma_{OW}$ is the interfacial tension between the infused liquid phase and the fluid phase.

The interfacial tension between the high surface area solid and the fluid phase may be determined by:

$$\gamma_{SW} = \gamma_S + \gamma_W - 2\sqrt{\gamma_S^d \gamma_w^d} - 2\sqrt{\gamma_S^p \gamma_w^p}$$

wherein:

$\gamma_S$ is the surface tension of the high surface area solid phase, $\gamma_W$ is the surface tension of the fluid phase, $\gamma_S^d$ is the dispersive component of the surface tension of the high surface area solid phase, $\gamma_S^p$ is the polar component of the surface tension of the high surface area solid phase, $\gamma_W^d$ is the dispersive component of the surface tension of the fluid phase, and $\gamma_W^p$ is the polar component of the surface tension of the fluid phase.

Similarly, the interfacial tension between the infused liquid phase and the high surface area solid may be determined by:

$$\gamma_{OS} = \gamma_O + \gamma_S - 2\sqrt{\gamma_O^d \gamma_S^d} - 2\sqrt{\gamma_O^p \gamma_S^p},$$

wherein:

$\gamma_O$ is the surface tension of the infused liquid phase, $\gamma_S$ is the surface tension of the high surface area solid phase, $\gamma_O^d$ is the dispersive component of the surface tension of the infused liquid phase, $\gamma_O^p$ is the polar component of the surface tension of the infused liquid phase, $\gamma_S^d$ is the dispersive component of the surface tension of the high surface area solid phase, and $\gamma_S^p$ is the polar component of the surface tension of the high surface area solid phase.

Similarly, the interfacial tension between the infused liquid and the fluid phase may be determined by:

$$\gamma_{OW} = \gamma_O + \gamma_W - 2\sqrt{\gamma_O^d \gamma_W^d} - 2\sqrt{\gamma_O^p \gamma_W^p},$$

wherein:

$\gamma_O$ is the surface tension of the infused liquid phase, $\gamma_W$ is the surface tension of the fluid phase, $\gamma_O^d$ is the dispersive component of the surface tension of the infused liquid phase, $\gamma_O^p$ is the polar component of the surface tension of the infused liquid phase, $\gamma_W^d$ is the dispersive component of the surface tension of the fluid phase, and $\gamma_W^p$ is the polar component of the surface tension of the fluid phase.

The surface tension of the high surface area solid, infused liquid, and/or working fluid may be determined by examining the dispersive ($\gamma_i^d$) and polar component ($\gamma_i^p$) of surface tension. Thus, the surface tension of the high surface area solid, infused liquid, and/or working fluid may be determined respectively by:

$$\gamma_S = \gamma_S^d + \gamma_S^p;$$

$$\gamma_O = \gamma_O^d + \gamma_O^p;$$

and/or $$\gamma_W = \gamma_W^d + \gamma_W^p.$$

Thus, FIG. 13 also illustrates the dependence of the spreading number Sn on surface tension of solid ($\gamma_S$) and infused liquid ($\gamma_O$).

Example 11

Self-Replenishing Porous Liquids

Figure 14:
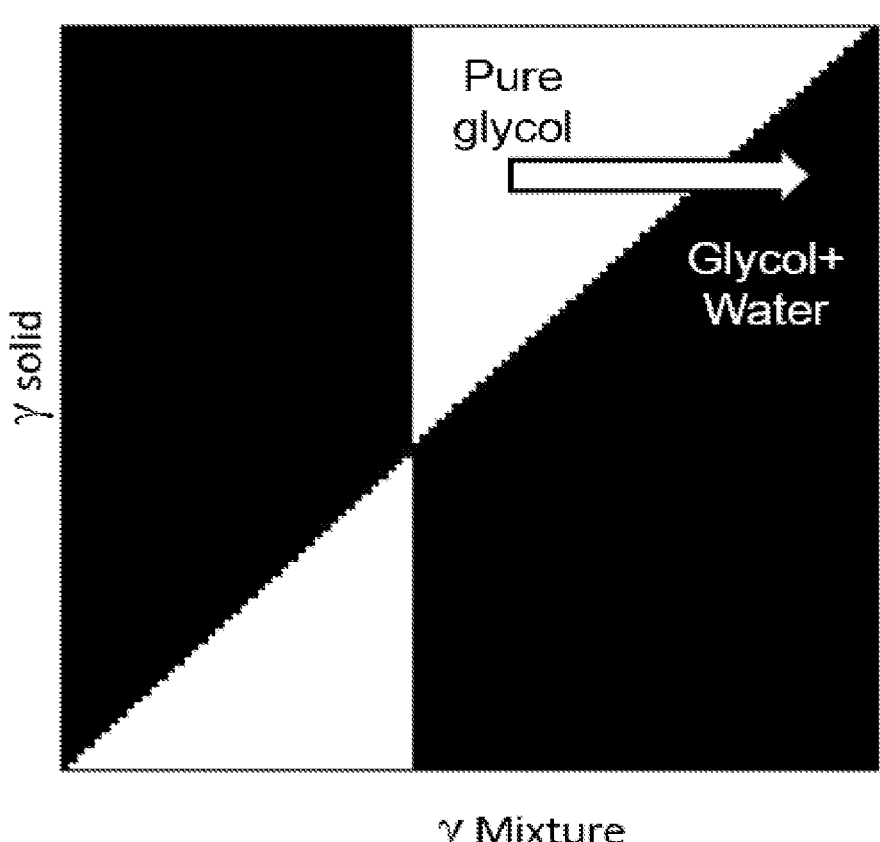
FIG. 14.

As shown in the Examples above and described through the present disclosure, the porous liquids of the present disclosure may be utilized to perform mass transfer from a working fluid that it comes in contact with. For example, water may be removed from a wet hydrocarbon gas through the use of a porous liquid with a glycol encapsulating liquid. It has been shown in unrelated systems that the surface tension of glycol is a function of water content and decreases as water content increases. As such, as a porous liquid of the present disclosure, such as a porous liquid having a glycol encapsulating liquid, facilitates the mass transfer of a species, substance, and/or substrate, such as water, from a working fluid, such as a wet hydrocarbon gas, the surface tension of the encapsulating liquid decreases. As a result, as demonstrated by the Example 6 above, the stability of the infused encapsulating liquid covering the high surface area solid decreases (e.g., moves from the white region toward or into the black region of FIG. 13). FIG. 14 illustrates this effect via the exemplary pairing of glycol as the encapsulating liquid and water as the substance that undergoes mass transfer. As can be seen, the stability of the glycol substantially covering the high surface area solid decreases as the concentration of water in the glycol increases, thereby moving the stability of the porous liquid from the white region (stable) to the black region (unstable)—i.e., the Sn moves from being positive (white region) to being negative (black region). As such, contacting an unstable porous liquid with fresh encapsulating liquid will result in the spent encapsulating liquid of the substance and/or substrate that undergoes a mass transfer being replaced by the fresh encapsulating liquid, which results in a stable encapsulating porous liquid or porous liquid enzyme.

The contents of all references, patents, pending patent applications and published patents, cited throughout this application are hereby expressly incorporated herein by reference.

Those skilled in the art will recognize, or be able to ascertain using no more than routine experimentation, many equivalents to the specific embodiments of the disclosure described herein. Such equivalents are intended to be encompassed by the following claims. It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A system comprising:
a high surface area solid capable of continuously refreshing an infused or encapsulating liquid coating, the high surface area solid comprising a reservoir configured to contain fresh or unused infused or encapsulating liquid therein and at least one inlet for supplying at least one of the fresh or unused infused or encapsulating liquid, pressure, or a combination thereof, wherein the high surface area solid comprises at least one of a rough surface, a textured surface, or any combination thereof, wherein the high surface area solid has a surface area of greater than 0.001 $m^2/g$, wherein: i) at least one side of the reservoir includes solid features extending outward therefrom, and ii) the reservoir comprises at least one opening that allows the fresh or unused infused or encapsulating liquid to flow from the reservoir to the solid features;
a working fluid immiscible with the infused or encapsulating liquid coating;
a liquid/fluid interface wherein the working fluid interacts with the infused or encapsulated liquid; and
wherein the system has a performance index of greater than 150 $m^{-1}$, wherein the performance index (PI) is defined as PI=(Vl/V)(Al/V), wherein V is the system volume defined as the geometric volume of the structure based only on the dimensions of the external surfaces, Vl and Al are the volume and surface area of an impregnated liquid, respectively, wherein the impregnated liquid refers to a liquid infused surface and a liquid encapsulated solid.

2. The system of claim 1, wherein the solid features are chemically functionalized to hold on the infused or encapsulating liquid coating.

3. The system of claim 1, wherein the solid features have:
a length that is no greater than about 100 times the width of the solid features;
a width of about 1 μm to about 10 mm; and/or
the solid features are about 10 μm to about 1,000 μm apart.

4. The system of claim 1, wherein:
the at least one opening has a width of about 1 μm to about 1,000 μm;
the reservoir has a width or a length that is as least about 0.1 mm; and/or
the reservoir has a height that is at least about 0.1 mm.

5. The system of claim 1, wherein the liquid-fluid interface is capable of facilitating mass transfer of at least one substance or substrate across the interface.

6. The system of claim 1, wherein the fluid is a gas.

7. The system of claim 1, wherein the fluid comprises carbon dioxide.

8. The system of claim 1, wherein the infused liquid comprises an amine, potassium hydroxide, or both.

9. The system of claim 1, wherein the fluid is a liquid.

10. The system of claim 1, wherein the fluid comprises furfural, the infused liquid comprises toluene, the high surface area solid comprises polyethylene, or combinations thereof.

11. The system of claim 1, wherein the fluid comprises water, the infused liquid comprises glycol, or combinations thereof.

12. A system comprising:
a high surface area solid partially covered by a liquid film, wherein the high surface area solid has a surface area greater than 0.001 $m^2/g$ and comprises solid features with an average dimension of about 0.1 μm to about 1000 μm located about 0.1 μm to about 500 μm apart, wherein the liquid film covers at least 30% of the surface area of the high surface area solid, wherein the high surface area solid comprises at least one of a rough surface, a textured surface, or any combination thereof, wherein the liquid film is maintained in contact with the high surface area solid by capillary forces, wherein the solid features with the average dimension refer to length, thickness, depth, height, or any combination thereof of rod-shaped objects;
a working fluid immiscible with the liquid film;
a liquid/fluid interface wherein the working fluid interacts with the liquid film;
a reservoir configured to contain liquid, wherein the reservoir comprises at least one inlet and at least one opening that allows the liquid to flow from the reservoir to the solid features to maintain the liquid film; and
wherein the system has a performance index of greater than 150 $m^{-1}$, wherein the performance index (PD) is defined as PI=(Vl/V)(Al/V), wherein V is the system volume defined as the geometric volume of the structure based only on the dimensions of the external surfaces, Vl and Al are the volume and surface area of an impregnated liquid, respectively, wherein the impregnated liquid refers to a liquid infused surface and a liquid encapsulated solid.

13. The system of claim 12, wherein the solid features have an average dimension of about 0.1 μm to about 100 μm and are located about 0.1 μm to about 500 μm apart, wherein the liquid film has a thickness from the bottom of the solid features to the top surface of the liquid film no greater than 1400 μm, and wherein the solid features are chemically functionalized to hold on the liquid film.

14. The system of claim 13, wherein the surface features have a height of about 1 μm to about 200 μm, wherein the surface area of the solid per volume of the high surface area solid is greater than 180 m$^{-1}$, wherein the liquid film has a thickness from the bottom of the solid features to the top surface of the liquid film of about 10 μm to about 1000 μm.

15. A system comprising:

a high surface area solid partially covered by a liquid film, wherein the high surface area solid has a surface area greater than 0.001 m$^2$/g and comprises solid features with an average dimension of about 0.1 μm to about 100 μm located about 0.1 μm to about 500 μm apart, wherein the surface features have a height of about 1 μm to about 200 μm, wherein the surface area of the solid per volume of the high surface area solid is greater than 180 m$^{-1}$, wherein the liquid film covers at least 30% of the surface area of the high surface area solid, wherein the high surface area solid comprises at least one of a rough surface, a textured surface, or any combination thereof, wherein the liquid film is maintained in contact with the high surface area solid by capillary forces, wherein the solid features with the average dimension refer to length, thickness, depth, height, or any combination thereof of rod-shaped objects;

wherein the liquid film has a thickness from the bottom of the solid features to the top surface of the liquid film of about 10 μm to about 1000 μm, wherein the solid features are chemically functionalized to hold on the liquid film, and wherein the system has a performance index of greater than 150 m$^{-1}$, wherein the performance index (PI) is defined as PI=(Vl/V)(Al/V), wherein V is the system volume defined as the geometric volume of the structure based only on the dimensions of the external surfaces, Vl and Al are the volume and surface area of an impregnated liquid, respectively, wherein the impregnated liquid refers to a liquid infused surface and a liquid encapsulated solid;

a working fluid immiscible with the liquid film;

a liquid/fluid interface wherein the working fluid interacts with the liquid film; and a reservoir configured to contain liquid, wherein the reservoir comprises at least one inlet and at least one opening that allows the liquid to flow from the reservoir to the solid features to maintain the liquid film.

\* \* \* \* \*